US012696301B2

(12) United States Patent
Agiwal

(10) Patent No.: US 12,696,301 B2
(45) Date of Patent: Jul. 28, 2026

(54) METHOD AND APPARATUS FOR PAGING EARLY INDICATION MONITORING BASED ON UE TYPE IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 18/296,291

(22) Filed: Apr. 5, 2023

(65) Prior Publication Data

US 2023/0319859 A1     Oct. 5, 2023

(30) Foreign Application Priority Data

Apr. 5, 2022     (KR) ........................ 10-2022-0042321

(51) Int. Cl.
*H04W 72/51*          (2023.01)
*H04W 68/02*          (2009.01)

(52) U.S. Cl.
CPC ........... *H04W 72/51* (2023.01); *H04W 68/02* (2013.01)

(58) Field of Classification Search
CPC ..... H04W 72/51; H04W 68/02; H04W 72/23; H04W 76/27; H04W 48/12; H04W 68/025; H04W 48/08; H04W 68/005; H04W 88/02; H04L 27/26025; H04L 27/261; H04L 5/0053; Y02D 30/70
See application file for complete search history.

(56) References Cited

U.S. PATENT DOCUMENTS

| | | | |
|---|---|---|---|
| 11,563,535 B2 * | 1/2023 | Lei | H04L 5/0053 |
| 2020/0204333 A1 | 6/2020 | Agiwal et al. | |
| 2021/0045098 A1 * | 2/2021 | Bi | H04W 68/02 |

(Continued)

FOREIGN PATENT DOCUMENTS

| | | |
|---|---|---|
| CN | 113056951 A | 6/2021 |
| CN | 113163476 A | 7/2021 |

(Continued)

OTHER PUBLICATIONS

International Search Report and Written Opinion of the International Searching Authority dated Jun. 30, 2023, in connection with International Application No. PCT/KR2023/004613, 7 pages.

(Continued)

*Primary Examiner* — Mohamed A Kamara

(57)          ABSTRACT

The disclosure relates to a 5G or 6G communication system for supporting a higher data transmission rate. Specifically, the present disclosure provides method and apparatus for paging early indication monitoring based on UE type including: receiving, from a base station, SIB1; and, in case that the SIB1 includes first information on a first initial downlink BWP for the reduced capability terminal and second information on a first PEI configuration for the reduced capability terminal, monitoring a PEI in a PDCCH of the first initial downlink BWP for the reduced capability terminal based on the first PEI configuration for the reduced capability terminal.

16 Claims, 10 Drawing Sheets

200

```
PEI-Config-r17 ::=              SEQUENCE {
    pei-SearchSpace-r17           SearchSpaceId,
    po-NumPerPEI-r17              ENUMERATED {1, 2, 4, 8},
    payloadSizeDCI-2-7-r17        INTEGER (1..maxDCI-2-7-size-r17),
    pei-FrameOffset-r17           INTEGER (0..16),
    firstPDCCH-MonitoringOccasionOfPEI-O-r17     CHOICE {
        sCS15KHZoneT-r17                                              SEQUENCE (SIZE (1..maxPEI-perPF)) OF INTEGER (0..139),
        sCS30KHZoneT-SCS15KHZhalfT-r17                                SEQUENCE (SIZE (1..maxPEI-perPF)) OF INTEGER (0..279),
        sCS60KHZoneT-SCS30KHZhalfT-SCS15KHZquarterT-r17               SEQUENCE (SIZE (1..maxPEI-perPF)) OF INTEGER (0..559),
        sCS120KHZoneT-SCS60KHZhalfT-SCS30KHZquarterT-SCS15KHZoneEighthT-r17     SEQUENCE (SIZE (1..maxPEI-perPF)) OF INTEGER (0..1119),
        sCS120KHZhalfT-SCS60KHZquarterT-SCS30KHZoneEighthT-SCS15KHZoneSixteenthT-r17     SEQUENCE (SIZE (1..maxPEI-perPF)) OF INTEGER (0..2239),
        sCS120KHZquarterT-SCS60KHZoneEighthT-SCS30KHZoneSixteenthT-r17     SEQUENCE (SIZE (1..maxPEI-perPF)) OF INTEGER (0..4479),
        sCS120KHZoneEighthT-SCS60KHZoneSixteenthT-r17                 SEQUENCE (SIZE (1..maxPEI-perPF)) OF INTEGER (0..8959),
        sCS120KHZoneSixteenthT-r17                                    SEQUENCE (SIZE (1..maxPEI-perPF)) OF INTEGER (0..17919)
    },
    subgroupConfig-r17            SubgroupConfig-r17
    lastUsedCellOnly-r17          ENUMERATED {true}                    OPTIONAL,      --Need R
    ...
}

SubgroupConfig-r17 ::=       SEQUENCE {
    subgroupsNumPerPO-r17                      INTEGER (1..maxNrofPagingSubgroups-r-17),
    subgroupsNumForUEID-r17                    INTEGER (1..maxNrofPagingSubgroups-r-17)      OPTIONAL,      --Need R
    ...
}
```

(56) References Cited

U.S. PATENT DOCUMENTS

| | | | |
|---|---|---|---|
| 2023/0146553 A1* | 5/2023 | Liao | H04W 24/08 |
| | | | 370/329 |
| 2023/0209464 A1* | 6/2023 | Tsai | H04W 52/0216 |
| | | | 370/311 |
| 2023/0224862 A1* | 7/2023 | Hwang | H04L 5/0053 |
| | | | 370/329 |
| 2024/0089921 A1 | 3/2024 | Ma et al. | |
| 2024/0137909 A1 | 4/2024 | Liu | |
| 2024/0196413 A1 | 6/2024 | Chatterjee et al. | |

FOREIGN PATENT DOCUMENTS

| | | | | |
|---|---|---|---|---|
| WO | 2021235860 A1 | 11/2021 | | |
| WO | 2022028436 A1 | 2/2022 | | |
| WO | WO-2023080521 A1 * | 5/2023 | | H04W 88/02 |

OTHER PUBLICATIONS

Moderator (Ericsson), "FL summary #1 on reduced maximum UE bandwidth for RedCap," R1-2110377, 3GPP TSG-RAN WG1 Meeting #106bis-e, e-Meeting, Oct. 11-19, 2021, 12 pages.

Supplementary European Search Report dated Jun. 16, 2025, in connection with European Application No. 23785000.3, 14 pages.

Huawei, et al., "Paging enhancement for UE power saving in IDLE/inactive mode," R1-2110837, 3GPP TSG RAN WG1 Meeting #107-e, e-Meeting, Nov. 11-19, 2021, 15 pages.

Qualcomm Incorporated, "BW Reduction for RedCap UE," R1-2110193, 3GPP TSG-RAN WG1 Meeting E106bis-e, e-Meeting, Oct. 11-19, 2021, 28 pages.

* cited by examiner

DownlinkConfigCommonSIB

The IE DownlinkConfigCommonSIB provides common downlink parameters of a cell.

100

DownlinkConfigCommonSIB information element

```
- - ASN1 START
- - TAG-DOWNLINKCONFIGCOMMONSIB-START

DownlinkConfigCommonSIB : : =    SEQUENCE  {
        frequencyInfoDL              FrequencyInfoDL-SIB,
        initialDownlinkBWP           BWP-DownlinkCommon,
        bcch-Config                    BCCH-Config,
        pcch-Config                    PCCH-Config, . . . +
        [[
        pei-Config-r17              PEI-Config-r17      OPTIONAL      --Need R
        ]]
}
```

```
PEI-Config-r17  ::=        SEQUENCE {
    pei-SearchSpace-r17        SearchSpaceId,
    po-NumPerPEI-r17           ENUMERATED {1, 2, 4, 8},
    payloadSizeDCI-2-7-r17     INTEGER (1..maxDCI-2-7-size-r17),
    pei-FrameOffset-r17        INTEGER (0..16),
    firstPDCCH-MonitoringOccasionOfPEI-O-r17    CHOICE {
        sCS15KHZoneT-r17                                         SEQUENCE (SIZE (1..maxPEI-perPF)) OF INTEGER (0..139),
        sCS30KHZoneT-SCS15KHZhalfT-r17                           SEQUENCE (SIZE (1..maxPEI-perPF)) OF INTEGER (0..279),
        sCS60KHZoneT-SCS30KHZhalfT-SCS15KHZquarterT-r17          SEQUENCE (SIZE (1..maxPEI-perPF)) OF INTEGER (0..559),
        sCS120KHZoneT-SCS60KHZhalfT-SCS30KHZquarterT-SCS15KHZoneEighthT-r17        SEQUENCE (SIZE (1..maxPEI-perPF)) OF INTEGER (0..1119),
        sCS120KHZhalfT-SCS60KHZquarterT-SCS30KHZoneEighthT-SCS15KHZoneSixteenthT-r17    SEQUENCE (SIZE (1..maxPEI-perPF)) OF INTEGER (0..2239),
        sCS120KHZquarterT-SCS60KHZoneEighthT-SCS30KHZoneSixteenthT-r17             SEQUENCE (SIZE (1..maxPEI-perPF)) OF INTEGER (0..4479),
        sCS120KHZoneEighthT-SCS60KHZoneSixteenthT-r17            SEQUENCE (SIZE (1..maxPEI-perPF)) OF INTEGER (0..8959),
        sCS120KHZoneSixteenthT-r17                               SEQUENCE (SIZE (1..maxPEI-perPF)) OF INTEGER (0..17919)
    },
    subgroupConfig-r17        SubgroupConfig-r17
    lastUsedCellOnly-r17      ENUMERATED {true}                                 OPTIONAL,        --Need R
    ...
}

SubgroupConfig-r17 ::=    SEQUENCE {
    subgroupsNumberPO-r17        INTEGER (1..maxNrofPagingSubgroups-r-17),
    subgroupsNumForUEID-r17      INTEGER (1..maxNrofPagingSubgroups-r-17)        OPTIONAL,        --Need R
    ...
}
```

FIG.2

DownlinkConfigCommonSIB

The IE DownlinkConfigCommonSIB provides common downlink parameters of a cell.

300

DownlinkConfigCommonSIB information element

```
- - ASN1 START
- - TAG-DOWNLINKCONFIGCOMMONSIB-START

DownlinkConfigCommonSIB : : =     SEQUENCE   {
        frequencyInfoDL                    FrequencyInfoDL-SIB,
        initialDownlinkBWP                 BWP-DownlinkCommon,
        bcch-Config                         BCCH-Config,
        pcch-Config                         PCCH-Config, . . . ,
        [[
        initialDownlinkBWP-Redcap-r17      BWP-DownlinkCommon   OPTIONAL       --Need R
        ]]
}
```

```
- - ASN1 START
- - TAG-DOWNLINKCONFIGCOMMONSIB-START

DownlinkConfigCommonSIB : : =      SEQUENCE  {
        frequencyInfoDL                 FrequencyInfoDL-SIB,
        initialDownlinkBWP              BWP-DownlinkCommon,
        bcch-Config                       BCCH-Config,
        pcch-Config                       PCCH-Config,
        . . . ,

[[
        pei-Config-r17                  PEI-Config-r17        OPTIONAL      --Need R
        ]]

[[
        pei-Config-RedCap-r17           PEI-Config-r17        OPTIONAL      --Need R
        ]]

```
PEI-Config-r17 ::=          SEQUENCE {
    pei-SearchSpace-r17         SearchSpaceId,
    po-NumPerPEI-r17            ENUMERATED {1, 2, 4, 8},
    payloadSizeDCI-2-7-r17      INTEGER (1..maxDCI-2-7-size-r17),
    pei-FrameOffset-r17         INTEGER (0..16),
    firstPDCCH-MonitoringOccasionOfPEI-0-r17    CHOICE {
        sCS15KHZoneT-r17                                                    SEQUENCE (SIZE (1..maxPEI-perPF)) OF INTEGER (0..139),
        sCS30KHZoneT-SCS15KHZhalfT-r17                                      SEQUENCE (SIZE (1..maxPEI-perPF)) OF INTEGER (0..279),
        sCS60KHZoneT-SCS30KHZhalfT-SCS15KHZquarterT-r17                     SEQUENCE (SIZE (1..maxPEI-perPF)) OF INTEGER (0..559),
        sCS120KHZoneT-SCS60KHZhalfT-SCS30KHZquarterT-SCS15KHZoneEighthT-r17 SEQUENCE (SIZE (1..maxPEI-perPF)) OF INTEGER (0..1119),
        sCS120KHZhalfT-SCS60KHZquarterT-SCS30KHZoneEighthT-SCS15KHZoneSixteenthT-r17 SEQUENCE (SIZE (1..maxPEI-perPF)) OF INTEGER (0..2239),
        sCS120KHZquarterT-SCS60KHZoneEighthT-SCS30KHZoneSixteenthT-r17      SEQUENCE (SIZE (1..maxPEI-perPF)) OF INTEGER (0..4479),
        sCS120KHZoneEighthT-SCS60KHZoneSixteenthT-r17                       SEQUENCE (SIZE (1..maxPEI-perPF)) OF INTEGER (0..8959),
        sCS120KHZoneSixteenthT-r17                                          SEQUENCE (SIZE (1..maxPEI-perPF)) OF INTEGER (0..17919)
    },
    subgroupConfig-r17          SubgroupConfig-r17
    lastUsedCellOnly-r17        ENUMERATED {true}          OPTIONAL,          --Need R
    ...
}
```

PDCCH-ConfigCommon information element

600

```
-- ASN1 START
-- TAG-PDCCH-CONFIGCOMMON-START

PDCCH-ConfigCommon ::=    SEQUENCE {
controlResourceSetZero              ControlResourceSetZero                        OPTIONAL,    -- Cond InitialBWP-only
commonControlResourceSet            ControlResourceSet                            OPTIONAL,    -- Need R
searchSpaceZero                     SearchSpaceZero                               OPTIONAL,    -- Cond InitialBWP-only
commonSearchSpaceList               SEQUENCE (SIZE (1..4)) OF SearchSpace         OPTIONAL,    -- Need R
searchSpaceSIB1                     SearchSpaceId                                 OPTIONAL,    -- Need S
searchSpaceOtherSystemInformation   SearchSpaceId                                 OPTIONAL,    -- Need S
pagingSearchSpace                   SearchSpaceId                                 OPTIONAL,    -- Need S
ra-SearchSpace                      SearchSpaceId                                 OPTIONAL,    -- Need S
...,
[[
firstPDCCH-MonitoringOccasionOfPO   CHOICE  {
    sCS15KHZoneT                                                            SEQUENCE (SIZE (1..maxPO-perPF)) OF INTEGER (0..139),
    sCS30KHZoneT-SCS15KHZhalfT                                              SEQUENCE (SIZE (1..maxPO-perPF)) OF INTEGER (0..279),
    sCS60KHZoneT-SCS30KHZhalfT-SCS15KHZquarterT                             SEQUENCE (SIZE (1..maxPO-perPF)) OF INTEGER (0..559),
    sCS120KHZoneT-SCS60KHZhalfT-SCS30KHZquarterT-SCS15KHZoneEighthT         SEQUENCE (SIZE (1..maxPO-perPF)) OF INTEGER (0..1119),
    sCS120KHZhalfT-SCS60KHZquarterT-SCS30KHZoneEighthT-SCS15KHZoneSixteenthT SEQUENCE (SIZE (1..maxPO-perPF)) OF INTEGER (0..2239),
    sCS120KHZquarterT-SCS60KHZoneEighthT-SCS30KHZoneSixteenthT              SEQUENCE (SIZE (1..maxPO-perPF)) OF INTEGER (0..4479),
    sCS120KHZoneEighthT-SCS60KHZoneSixteenthT                               SEQUENCE (SIZE (1..maxPO-perPF)) OF INTEGER (0..8959),
    sCS120KHZoneSixteenthT                                                  SEQUENCE (SIZE (1..maxPO-perPF)) OF INTEGER (0..17919),
}                                                                           OPTIONAL,  -- Cond otherBWP
]],
[[
commonSearchSpaceListExt-r16        SEQUENCE (SIZE (1..4)) OF SearchSpaceExt-r16   OPTIONAL,    -- Need R
]],
[[ pei-SearchSpace-r17                 SearchSpaceId,                                 OPTIONAL    -- Cond X firstPDCCH-MonitoringOccasionOfPEI-O-r17    CHOICE  {
    sCS15KHZoneT-r17                                                          SEQUENCE (SIZE (1..maxPEI-perPF)) OF INTEGER (0..139),
    sCS30KHZoneT-SCS15KHZhalfT-r17                                            SEQUENCE (SIZE (1..maxPEI-perPF)) OF INTEGER (0..279),
    sCS60KHZoneT-SCS30KHZhalfT-SCS15KHZquarterT-r17                           SEQUENCE (SIZE (1..maxPEI-perPF)) OF INTEGER (0..559),
    sCS120KHZoneT-SCS60KHZhalfT-SCS30KHZquarterT-SCS15KHZoneEighthT-r17       SEQUENCE (SIZE (1..maxPEI-perPF)) OF INTEGER (0..1119),
    sCS120KHZhalfT-SCS60KHZquarterT-SCS30KHZoneEighthT-SCS15KHZoneSixteenthT-r17 SEQUENCE (SIZE (1..maxPEI-perPF)) OF INTEGER (0..2239),
    sCS120KHZquarterT-SCS60KHZoneEighthT-SCS30KHZoneSixteenthT-r17            SEQUENCE (SIZE (1..maxPEI-perPF)) OF INTEGER (0..4479),
    sCS60KHZoneEighthT-SCS60KHZoneSixteenthT-r17                              SEQUENCE (SIZE (1..maxPEI-perPF)) OF INTEGER (0..8959),
    sCS120KHZoneSixteenthT-r17                                               SEQUENCE (SIZE (1..maxPEI-perPF)) OF INTEGER (0..17919)
}                                                                            OPTIONAL    -- Cond X
```

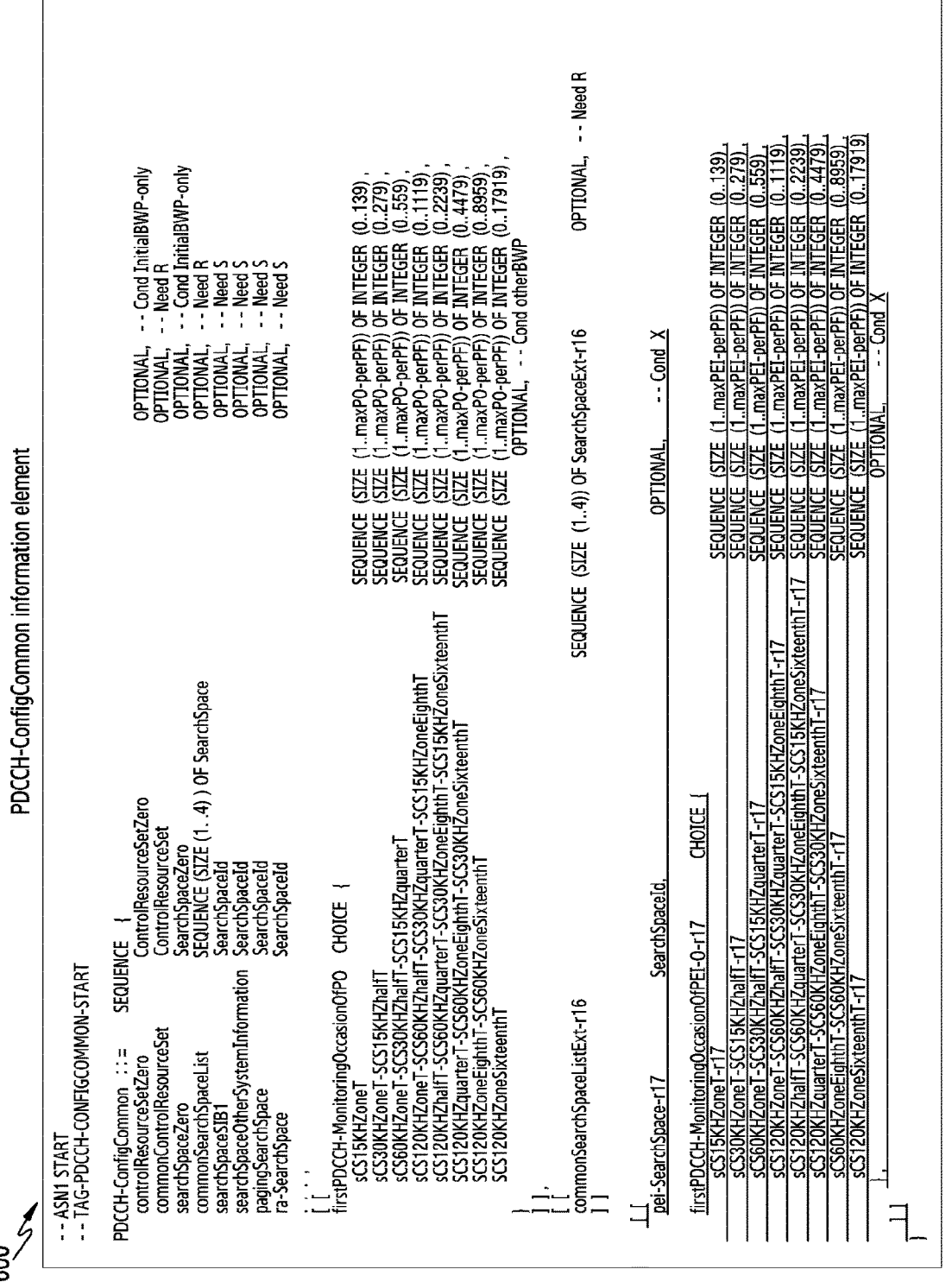

```
PEI-ConfigRedCap-r17  ::=      SEQUENCE {
pei-SearchSpace-r17           SearchSpaceId,
firstPDCCH-MonitoringOccasionOfPEI-O-r17        CHOICE {
    sCS15KHZoneT-r17                                                                    SEQUENCE (SIZE (1..maxPEI-perPF)) OF INTEGER (0..139),
    sCS30KHZoneT-SCS15KHZhalfT-r17                                                      SEQUENCE (SIZE (1..maxPEI-perPF)) OF INTEGER (0..279),
    sCS60KHZoneT-SCS30KHZhalfT-SCS15KHZquarterT-r17                                     SEQUENCE (SIZE (1..maxPEI-perPF)) OF INTEGER (0..559),
    sCS120KHZoneT-SCS60KHZhalfT-SCS30KHZquarterT-SCS15KHZoneEighthT-r17                 SEQUENCE (SIZE (1..maxPEI-perPF)) OF INTEGER (0..1119),
    sCS120KHZhalfT-SCS60KHZoneEighthT-SCS30KHZoneSixteenthT-r17                         SEQUENCE (SIZE (1..maxPEI-perPF)) OF INTEGER (0..2239),
    sCS120KHZquarterT-SCS60KHZoneEighthT-SCS30KHZoneSixteenthT-r17                      SEQUENCE (SIZE (1..maxPEI-perPF)) OF INTEGER (0..4479),
    sCS120KHZoneEighthT-SCS60KHZoneSixteenthT-r17                                       SEQUENCE (SIZE (1..maxPEI-perPF)) OF INTEGER (0..8959),
    sCS120KHZoneSixteenthT-r17                                                          SEQUENCE (SIZE (1..maxPEI-perPF)) OF INTEGER (0..17919)
    }
    ...
}
```

| TRANSCEIVER | CONTROLLER | MEMORY |

METHOD AND APPARATUS FOR PAGING EARLY INDICATION MONITORING BASED ON UE TYPE IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0042321, filed Apr. 5, 2022, filed in the Korean Intellectual Property Office, the disclosures of which are incorporated by reference herein in their entirety.

BACKGROUND

1. Field

The disclosure relates to a wireless communication system (or a mobile communication system). Specifically, the disclosure relates to an apparatus, a method and a system for paging early indication (PEI) monitoring based on user equipment (UE) type in wireless communication system.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Recently, there are needs to enhance paging early indication monitoring with regard to UE type to enhance wireless communication system.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal is provided. The method comprises: receiving, from a base station, system information block 1 (SIB1); and in case that the SIB1 includes first information on a first initial downlink bandwidth part (BWP) for reduced capability terminal and second information on a first paging early indication (PEI) configuration for reduced capability terminal, monitoring a PEI in a physical downlink control channel (PDCCH) of the first initial downlink BWP for reduced capability terminal based on the first PEI configuration for reduced capability terminal.

In accordance with another aspect of the disclosure, a terminal is provided. The terminal comprises: a transceiver; and a controller coupled with the transceiver and configured to: receive, from a base station, system information block 1 (SIB1), and in case that the SIB1 includes first information on a first initial downlink bandwidth part (BWP) for reduced capability terminal and second information on a first paging early indication (PEI) configuration for reduced capability terminal, monitor a PEI in a physical downlink control channel (PDCCH) of the first initial downlink BWP for reduced capability terminal based on the first PEI configuration for reduced capability terminal.

In accordance with another aspect of the disclosure, a method performed by a base station is provided. The method comprises: transmitting, to a terminal with reduced capability, system information block 1 (SIB1); and in case that the SIB1 includes first information on a first initial downlink bandwidth part (BWP) for reduced capability terminal and second information on a first paging early indication (PEI) configuration for reduced capability terminal, transmitting a PEI in a physical downlink control channel (PDCCH) of the first initial downlink BWP for reduced capability terminal based on the first PEI configuration for reduced capability terminal.

In accordance with another aspect of the disclosure, a base station is provided. The base station comprises: a transceiver; and a controller coupled with the transceiver and configured to: transmit, to a terminal with reduced capability, system information block 1 (SIB1), and in case that the SIB1 includes first information on a first initial downlink bandwidth part (BWP) for reduced capability terminal and second information on a first paging early indication (PEI) configuration for reduced capability terminal, transmit a PEI in a physical downlink control channel (PDCCH) of the first initial downlink BWP for reduced capability terminal based on the first PEI configuration for reduced capability terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates an example of PEI configuration in accordance with an embodiment of the present disclosure;

FIG. 2 illustrates another example of PEI configuration in accordance with an embodiment of the present disclosure;

FIG. 3 illustrates an example of BWP configuration in accordance with an embodiment of the present disclosure;

FIG. 4 illustrates yet another example of PEI configuration in accordance with an embodiment of the present disclosure;

FIG. 5 illustrates yet another example of PEI configuration in accordance with an embodiment of the present disclosure;

FIG. 6 illustrates yet another example of PEI configuration in accordance with an embodiment of the present disclosure;

FIG. 8 illustrates yet another example of PEI configuration in accordance with an embodiment of the disclosure;

Throughout the drawings, like reference numerals will be understood to refer to like parts, components, and structures.

DETAILED DESCRIPTION

Figure 7:
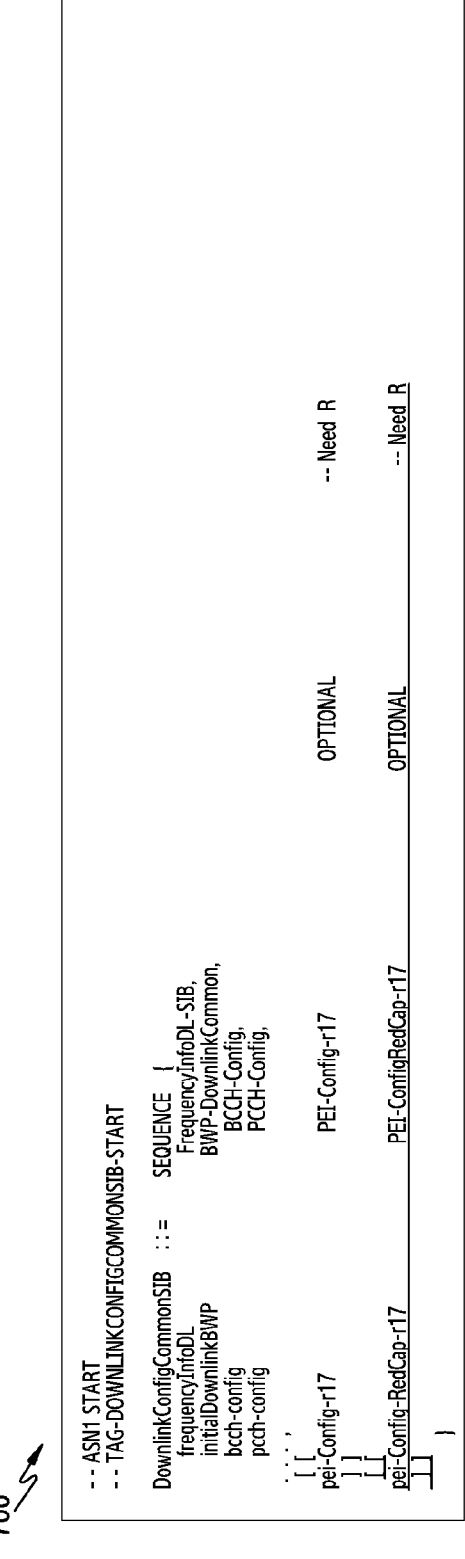
FIG. 7 illustrates yet another example of PEI configuration in accordance with an embodiment of the present disclosure.

FIGS. 1 through 10, discussed below, and the various embodiments used to describe the principles of the present

5

6 disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (B S)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the fifth generation wireless communication system operating in higher frequency (mmWave) bands, UE and gNB (next generation node B) communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas.

In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions.

Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The 5G wireless communication system, supports standalone mode of operation as well dual connectivity (DC). In DC, a multiple Rx/Tx UE may be configured to utilize resources provided by two different nodes (or NBs) connected via non-ideal backhaul. One node acts as the master node (MN) and the other as the secondary node (SN). The MN and SN are connected via a network interface and at least the MN is connected to the core network. NR also supports multi-RAT dual connectivity (MR-DC) operation whereby a UE in RRC (radio resource control)_CONNECTED is configured to utilise radio resources provided by two distinct schedulers, located in two different nodes connected via a non-ideal backhaul and providing either evolved universal mobile telecommunications system (UMTS) terrestrial radio access (E-UTRA)) (i.e., if the node is an ng-eNB) or NR access (i.e., if the node is a gNB).

In NR for a UE in RRC_CONNECTED not configured with CA/DC there is only one serving cell comprising of the primary cell. For a UE in RRC_CONNECTED configured with CA/DC the term "serving cells" is used to denote the set of cells comprising of the special cell(s) and all secondary cells. In NR, the term master cell group (MCG) refers to a group of serving cells associated with the master node, comprising of the primary cell (PCell) and optionally one or more secondary cells (SCells). In NR, the term secondary cell group (SCG) refers to a group of serving cells associated with the Secondary Node, comprising of the primary SCG cell (PSCell) and optionally one or more SCells.

In NR PCell refers to a serving cell in MCG, operating on the primary frequency, in which the UE either performs the initial connection establishment procedure or initiates the connection re-establishment procedure. In NR for a UE configured with CA, Scell is a cell providing additional radio resources on top of special cell (SpCell). Primary SCG cell refers to a serving cell in SCG in which the UE performs random access when performing the reconfiguration with sync procedure. For a dual connectivity operation, the term SpCell (i.e., Special Cell) refers to the PCell of the MCG or the PSCell of the SCG, otherwise the term special cell refers to the PCell.

In 5G wireless communication system, physical downlink control channel (PDCCH) is used to schedule downlink (DL) transmissions on physical downlink shared channel (PDSCH) and uplink (UL) transmissions on PUSCH, where the downlink control information (DCI) on PDCCH includes: downlink assignments containing at least modulation and coding format, resource allocation, and hybrid-ARQ information related to downlink shared channel (DL-SCH); uplink scheduling grants containing at least modulation and coding format, resource allocation, and hybrid-ARQ information related to uplink shared channel (UL-SCH).

In addition to scheduling, PDCCH can be used to for: activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and orthogonal frequency division multiplexing (OFDM) symbol(s) where the UE may assume no transmission is intended for the UE; transmission of transmission power control (TPC) commands for physical uplink control channel (PUCCH) and physical uplink shared channel (PUSCH); transmission of one or more TPC commands for sounding reference signal (SRS) transmissions by one or more UEs; switching a UE's active bandwidth part; and initiating a random access procedure.

A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE including a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. quadrature phase shift keying (QPSK) modulation is used for PDCCH.

In 5G wireless communication system, a list of search space configurations is signaled by GNB for each configured BWP wherein each search configuration is uniquely identified by an identifier. Identifier of search space configuration to be used for specific purpose such as paging reception, system information (SI) reception, random access response reception is explicitly signaled by a gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots "x" to x+duration where the slot with number "x" in a radio frame with number "y" satisfies the equation 1 below:

$$(y*(\text{number of slots in } a \text{ radio frame})+x-\text{Monitoring-offset-PDCCH-slot}) \bmod (\text{Monitoring-periodicity-PDCCH-slot})=0. \qquad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations is signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends on a radio frame for each supported subcarrier spacing (SCS) is pre-defined in NR.

Each coreset configuration is associated with a list of TCI (Transmission configuration indicator) states. One DL RS ID (synchronization signal and physical broadcast channel block (SSB) or channel state information reference signal (CSI-RS)) is configured per TCI state. The list of TCI states corresponding to a coreset configuration is signaled by a gNB via RRC signaling. One of the TCI state in TCI state list is activated and indicated to a UE by a gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In 5G wireless communication system bandwidth part(s) are supported. The receive and transmit bandwidth of a UE need not be as large as the bandwidth of the cell and can be adjusted: the width can be ordered to change (e.g., to shrink during period of low activity to save power); the location can move in the frequency domain (e.g., to increase scheduling flexibility); and the subcarrier spacing can be ordered to change (e.g., to allow different services). A subset of the total cell bandwidth of a cell is referred to as a Bandwidth Part (BWP).

In 5G wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e., no RRC connection is established, the UE is in RRC_IDLE state. The RRC states can further be characterized as follows:

In the RRC_IDLE, a UE specific discontinuous reception (DRX) may be configured by upper layers. The UE monitors short messages transmitted with paging radio network temporary identifier (P-RNTI) over DCI; monitors a paging channel for core network (CN) paging using 5G-S-TMSI (5G S-temporary mobile subscriber identity); performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; a UE stores the UE Inactive access stratum (AS) context; a RAN-based notification area is configured by RRC layer. The UE monitors short messages transmitted with P-RNTI over DCI; monitors a paging channel for CN paging using 5G-S-TMSI and RAN paging using full I-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors short messages transmitted with P-RNTI over DCI, if configured; monitors control channels associated with the shared data channel to determine if data is scheduled for it; provides channel quality and feedback information; performs neighbouring cell measurements and measurement reporting; acquires system information.

The 5G or next generation radio access network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the access and mobility management function (AMF) by means of the NG-C interface and to the user plane function (UPD) by means of the NG-U interface.

In the 5th generation (also referred as NR or New Radio) wireless communication system, the UE may use DRX in RRC_IDLE and RRC_INACTIVE state in order to reduce power consumption. In the RRC_IDLE/RRC_INACTIVE state, a UE wake ups at regular intervals (i.e., every DRX cycle) for short periods to receive paging, to receive SI update notification and to receive emergency notifications. A paging message is transmitted using PDSCH. PDCCH is addressed to P-RNTI if there is a paging message in PDSCH. P-RNTI is common for all UEs. A UE identity (i.e., S-TMSI for RRC_IDLE UE or I-RNTI for RRC_INACTIVE UE) is included in paging message to indicate paging for a specific UE. A paging message may include multiple UE identities to page multiple UEs. A paging message is broadcasted (i.e., PDCCH is masked with P-RNTI) over data channel (i.e., PDSCH). SI update and emergency notifications are included in DCI and PDCCH carrying this DCI is addressed to P-RNTI.

In the RRC idle/inactive mode, a UE monitors one paging occasion (PO) every DRX cycle. In the RRC idle/inactive mode, a UE monitors PO in initial DL BWP. In an RRC connected state, a UE monitors one or more Pos to receive SI update notification and to receive emergency notifications. A UE can monitor any PO in paging DRX cycle and monitors at least one PO in SI modification period. In the RRC idle/inactive mode, a UE monitors PO in its active DL BWP. APO is a set of "S" PDCCH monitoring occasions for paging, where "S" is the number of transmitted SSBs (i.e., the SSB consists of primary synchronization signal (PSS) and secondary synchronization signal (SSS) and PBCH) in cell. A UE first determines the paging frame (PF) and then determines the PO with respect to the determined PF. One PF is a radio frame (10 ms).

The PF for a UE is the radio frame with system frame number "SFN" which satisfies the equation (SFN+ PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, a UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e., NAS), the default value is applied.

N: number of total paging frames in T.

Ns: number of paging occasions for a PF.

PF_offset: offset used for PF determination.

UE_ID: 5G-S-TMSI mod 1024.

Parameters Ns, nAndPagingFrameOffset, and the length of default DRX Cycle are signaled in SIB1. The values of N and PF_offset are derived from the parameter nAndPagingFrameOffset as defined in TS 38.331. If the UE has no 5G-S-TMSI, for instance when the UE has not yet registered onto the network, the UE may use as default identity UE_ID=0 in the PF and i_s formulas above.

The PDCCH monitoring occasions for paging are determined based on paging search space configuration (paging-SearchSpace) signaled by a gNB.

When SearchSpaceId=0 is configured for paging-SearchSpace, the PDCCH monitoring occasions for paging are same as for RMSI as defined in clause 13 in TS 38.213. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by a gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of "S" consecutive PDCCH monitoring occasions for paging starting from the PDCCH monitoring occasion number indicated by firstPDCCH-MonitoringOccasionOfPO (i.e., the $(i\_s+1)^{th}$ value of the firstPDCCH-MonitoringOccasionOfPO parameter).

Otherwise, the $(i\_s+1)^{th}$ PO is a set of "S" consecutive PDCCH monitoring occasions for paging starting from the $(i\_s*S)^{th}$ PDCCH monitoring occasion for paging. "S" is the number of actual transmitted SSBs determined according to parameter ssb-PositionsInBurst signalled in SystemInformationBlock1 received from a gNB. The parameter first-PDCCH-MonitoringOccasionOfPO is signalled in SIB1 for paging in initial DL BWP. For paging in a DL BWP other than the initial DL BWP, the parameter first-PDCCH-MonaoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1;

Short Messages—8 bits according to Table 2. If only the scheduling information for Paging is carried, this bit field is reserved;

Frequency domain resource assignment—

$$\lceil \log_2 (N_{RB}^{DL,BWP}(N_{RB}^{DL,BWP} + 1)/2) \rceil$$

bits. If only the short message is carried, this bit field is reserved;

$$N_{RB}^{DL,BWP}$$

is the size of CORESET 0;

Time domain resource assignment—4 bits. If only the short message is carried, this bit field is reserved;

VRB (virtual resource block)-to-PRB mapping—1 bit. If only the short message is carried, this bit field is reserved;

Modulation and coding scheme—5 bits. If only the short message is carried, this bit field is reserved;

TB (transport block) scaling—2 bits. If only the short message is carried, this bit field is reserved; and Reserved bits—6 bits.

TABLE 1

| Bit field | Short Message indicator |
|-----------|-------------------------|
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines short message (e.g., Bit 1 is the most significant bit).

TABLE 2

| Bit | Short Message |
|-----|---------------|
| 1 | systemInfoModification If set to 1: indication of a BCCH modification other than SIB6, SIB7 and SIB8. |
| 2 | etwsAndCmasIndication If set to 1: indication of an ETWS primary notification and/or an ETWS secondary notification and/or a CMAS notification. |
| 3-8 | Reserved |

UE power saving for paging monitoring in NR: in order to reduce UE power consumption due to false paging alarms, the group of UEs monitoring the same PO can be further divided into multiple subgroups. With subgrouping, a UE may monitor PDCCH in its PO for paging if the subgroup to which the UE belongs is paged as indicated via associated paging early indication (PEI). If a UE cannot find its subgroup ID with the PEI configurations in a cell or if the UE is unable to monitor the associated PEI occasion corresponding to its PO, the UE may monitor the paging in its PO. These subgroups have the following characteristics:

The subgroups are formed based on either CN controlled subgrouping or a UE ID based subgrouping;

If specific subgrouping information is not provided from CN, a UE ID based subgrouping is used if supported by the UE and network;

The RRC state (RRC_IDLE or RRC_INACTIVE state) does not impact UE subgroup of a UE;

Subgrouping support for RAN is broadcast in the system information as one of the following: Only CN controlled subgrouping, Only UE ID based subgrouping supported or both CN controlled subgrouping and UE ID based subgrouping supported;

Total number of subgroupings allowed in a cell is limited to 8 and represents the sum of CN-assigned and UEID-based subgrouping configured by the network; and A UE with CN-assigned subgroup ID may derive UEID-based subgroup ID in a cell supporting only UEID-based subgrouping.

PEI associated with subgroups has the following characteristics:

If the PEI is supported by the UE, the UE may at least support UEID-based subgrouping method;

PEI monitoring can be limited via system information to the cell in which its last connection was released;

A PEI-capable UE may store its last used cell information; and

A UE that expects multicast and broadcast service (MBS) group notification may ignore the PEI and may monitor paging in its PO.

CN controlled subgrouping: access and mobility management function (AMF) is responsible for assigning subgroup ID to the UE. The total number of subgroups for CN controlled subgrouping can be configured up to 8, e.g., by operations, administration and maintenance (OAM).

A UE ID based subgrouping: a gNB and a UE can determine the subgroup ID based on the UE ID and the total number of subgroups for the UE ID based subgrouping in the cell. The total number of subgroups for UE ID based subgrouping is decided by the gNB for each cell and can be different in different cells.

PEI reception in NR: The UE may use PEI in RRC_IDLE and RRC_INACTIVE states in order to reduce power consumption. If PEI configuration is provided in system information, the UE in RRC_IDLE or RRC_INACTIVE state supporting PEI (except for the UEs expecting multicast session activation notification) can monitor PEI using PEI parameters in system information according to the procedure described below.

If lastUsedCellOnly is configured in system information of a cell, the UE monitors PEI only in the cell if the UE most recently entered RRC_IDLE or RRC_INACTIVE states in this cell. Otherwise, the UE monitors PEI in the camped cell regardless of which cell the UE most recently entered RRC_IDLE or RRC_INACTIVE states.

The UE monitors one PEI occasion per DRX cycle. A PEI occasion (PEI-O) is a set of PDCCH monitoring occasions (MOs) and can consist of multiple time slots (e.g., subframe or OFDM symbol) where PEI can be sent. The time location of PEI-O for UE's PO is determined by a reference point and an offset from the reference point to the start of the first PDCCH monitoring occasion of this PEI-O:

The reference point is the start of a reference frame determined by a frame-level offset from the start of the first PF of the PF(s) associated with the PEI-O, provided by PEI-F offset in SIB1; and The offset is a symbol-level offset from the reference point to the start of the first PDCCH MO of PEI-O, provided by firstPDCCH-MonitoringOccasionOfPEI-O in SIB1.

If one PEI-O is associated with POs of two PFs, the two PFs are consecutive PFs calculated by the parameters PF_offset, T, Ns, and N. The first PF of the PFs associated with the PEI-O is provided by ((SFN for PF)—floor ($i_{PO}$/$N_S$)*T/N, $i_{PO}$=((UE_ID mod N)*$N_S$+i_s) mod po-NumPer-PEI, and po-NumPerPEI is configured via SIB, T, Ns, and N are same as determined to calculate PO.

The PDCCH monitoring occasions for PEI are determined according to pei-SearchSpace, PEI-F_offset, firstPDCCH-MonitoringOccasionOfPEI-O and nrofPDCCH-MonitoringOccasionPerSSB-InPO if configured. When Search-SpaceId=0 is configured for pei-SearchSpace, the PDCCH monitoring occasions for PEI are same as for RMSI. A UE determines first PDCCH MO for PEI-O based on PEI-F_offset and firstPDCCH-MonitoringOccasionOfPEI-O, as for the case with SearchSpaceId>0 configured.

When SearchSpaceId=0 is configured for peiSearchSpac, the UE monitors the PEI-O according to searchSpaceZero. When SearchSpaceId other than 0 is configured for peiSearchSpace, the UE monitors the PEI-O according to the SearchSpace of the configured SearchSpaceId.

A PEI occasion is a set of "S*X" consecutive PDCCH monitoring occasions, where "S" is the number of actual transmitted SSBs determined according to ssb-PositionsIn-Burst in SIB1, and X is the nrofPDCCH-MonitoringOccasionPerSSB-InPO if configured or is equal to 1 otherwise. The [x*S+K]$^{th}$ PDCCH monitoring occasion for PEI in the PEI occasion corresponds to the K$^{th}$ transmitted SSB, where x=0, 1, . . . , X−1, K=1, 2, . . . , S. The PDCCH monitoring occasions for PEI which do not overlap with UL symbols (determined according to tdd-UL-DL-ConfigurationCommon) are sequentially numbered from zero starting from the first PDCCH monitoring occasion for PEI in the PEI-O. When the UE detects a PEI within its PEI-O, the UE is not required to monitor the subsequent monitoring occasion(s) associated with the same PEI-O.

If the UE detects PEI and the PEI indicates the subgroup the UE belongs to monitor its associated PO, the UE monitors the associated PO. If the UE does not detect PEI on the monitored PEI occasion or the PEI does not indicate the subgroup the UE belongs to monitor its associated PO, the UE is not required to monitor the associated PO. If the UE is unable to monitor the PEI occasion (i.e., all valid PDCCH monitoring occasion for PEI) corresponding to its PO, e.g., during cell re-selection, the UE monitors the associated PO.

If PEI and subgrouping are configured, UEs monitoring the same PO can be divided into one or more subgroups. With subgrouping, the UE monitors PO if the corresponding bit for subgroup the UE belongs to is indicated as 1 by PEI corresponding to its PO. UE's subgroup can be either assigned by CN or formed based on a UE_ID:

If subgroupsNumForUEID is absent in subgroupConfig, the subgroup ID based on CN assigned subgrouping is used in the cell;

If both subgroupsNumPerPO and subgroupsNumForUEID are configured, and subgroupsNumForUEID has the same value as subgroupsNumPerPO, the subgroup ID based on a UE_ID based subgrouping is used in the cell; and If both subgroupsNumPerPO and subgroupsNumForUEID are configured, and subgroups- NumForUEID<subgroupsNumPerPO, the subgroup ID based on CN assigned subgrouping, if available for the UE, is used in the cell; otherwise, the subgroup ID based on a UE_ID based subgrouping is used in the cell.

The following parameters are used for the determination of subgroup ID:

subgroupsNumPerPO: number of subgroups for total CN assigned subgrouping (if any) and a UE_ID based subgrouping (if any) in a PO, which is broadcasted in system information; and subgroupsNumForUEID: number of subgroups for a UE_ID based subgrouping in a PO, which is broadcasted in system information.

If a UE has no CN assigned subgroup ID or does not support CN-assigned subgrouping, and there is no configuration for subgroupsNumForUEID, the UE monitors paging in its associated PO.

Paging with CN assigned subgrouping is used in the cell which supports CN assigned subgrouping. A UE supporting CN assigned subgrouping in RRC_IDLE or RRC_INACTIVE state can be assigned a subgroup ID (between 0 to 7) by AMF through NAS signalling. The UE belonging to the assigned subgroup ID monitors its associated PEI which indicates the paged subgroup(s).

Paging with a UE_ID based subgrouping is used in the cell which supports a UE_ID based subgrouping. If the UE is not configured with a CN assigned subgroup ID, or if the UE configured with a CN assigned subgroup ID is in a cell supporting only UE_ID based subgrouping, the subgroup ID of the UE is determined by following equation 2:

$$\text{SubgroupID=(floor(}UE\_ID/(N*Ns)\text{))mod subgroupsNumForUEID)+(subgroupsNumPerPO–subgroupsNumForUEID).} \qquad \text{Equation 2}$$

Where:

N: number of total paging frames in T;

Ns: number of paging occasions for a PF;

UE_ID: 5G-S-TMSI mod X, where X is 32768, if eDRX is applied; otherwise, Xi s 8192; and subgroupsNumForUEID: number of subgroups for UE_ID based subgrouping in a PO, which is broadcasted in system information.

FIG. 1 and FIG. 2 illustrate examples of PEI configuration in accordance with embodiments of the present disclosure.

The PEI configuration (pei-Config-17) is broadcasted in SIB1 (SIB1→ServingCellConfigCommonSIB→ DownlinkConfigCommonSIB→pei-Config-r17) as shown in 100 of FIG. 1. pei-Config-17 is of type PEI-Config-17 which includes several parameters as shown in 200 of FIG. 2.

A reduced capability (redcap) UE specific initial DL BWP is also introduced. The configuration of initial DL BWP for redcap UE (initialDownlinkBWP-RedCap-r17 IE) is signalled in SIB1 as shown below. If SIB1 includes initialDownlinkBWP-RedCap-r17 IE and pagingSearchSpace is configured in this initial DL BWP for redcap UE, a UE monitors PO(s) for paging in initial DL BWP indicated by initialDownlinkBWP-RedCap-r17. A redcap UE is a UE with reduced capabilities as specified in TS 38.306. RedCap UE is the UE with reduced capability:

The maximum bandwidth is 20 MHz for frequency range 1 (FR1), and is 100 MHz for frequency range 2 (FR2). UE features and corresponding capabilities related to UE bandwidths wider than 20 MHz in FR1 or wider than 100 MHz in FR2 are not supported by RedCap UEs;

The maximum mandatory supported data radio bearer (DRB) number is 8;

The mandatory supported packet data convergence protocol (PDCP) sequence number (SN) length is 12 bits while 18 bits being optional;

The mandatory supported radio link control (RLC) acknowledged mode (AM) SN length is 12 bits while 18 bits being optional; and 1 DL MIMO layer if 1 Rx branch is supported, and 2 DL MIMO layers if 2 Rx branches are supported. UE features and corresponding capabilities related to more than 2 UE Rx branches and more than 2 DL MIMO layers, as well as UE features and capabilities related to more than 2 UE Tx branches and more than 2 UL MIMO layers are not supported by RedCap UEs.

CA, MR-DC, dual active protocol stack (DAPS), conditional PSCell addition and change (CPAC) and integrated access and backhaul (IAB) (i.e., the RedCap UE is not expected to act as an IAB node) related UE features and corresponding capabilities are not supported by RedCap UEs. All other feature groups or components of the feature groups as captured in TR 38.822 as well as capabilities specified in this specification remain applicable for RedCap UEs same as non-RedCap UEs, unless indicated otherwise.

FIG. 3 illustrates an example of bandwidth part (BWP) configuration in accordance with an embodiment of the present disclosure.

Currently, a UE monitors PEI only on the initial DL BWP. PEI monitoring is not supported in redcap specific initial DL BWP. It is beneficial to support PEI monitoring for redcap UEs in redcap specific initial DL BWP (e.g., 300 in FIG. 3). Some signalling enhancements are needed to enable this as the pei-Config-r17 signalled in SIB1 cannot be applied to redcap specific initial DL BWP as PDCCH configurations and SCS for redcap specific initial DL BWP can be different from those of initial DL BWP.

Embodiment 1

FIG. 4 illustrates another example of PEI configuration in accordance with an embodiment of the present disclosure.

In this method of the disclosure, it is provided to introduce a new field/IE "pei-Config-Redcap-r17" in SIB1. The "pei-Config-Redcap-r17" is of type PEI-Config-r17 (as shown in 200 of FIG. 2). In the SIB1, it can be included in the IE DownlinkConfigCommonSIB (SIB1→ServingCellConfig CommonSIB→DownlinkConfigCommonSIB) as shown in FIG. 4. In an embodiment, a gNB includes pei-Config-Redcap-r17 in SIB1 if initialDownlinkBWP-RedCap-r17 is included in SIB1 and pagingSearchSpace is configured for this BWP, Otherwise not. In another embodiment, gNB includes pei-Config-Redcap-r17 in SIB1 if initialDownlinkBWP-RedCap-r17 is included in SIB1, Otherwise not.

A UE is in RRC_IDLE or RRC_INACTIVE:

A UE acquires SIB1 from the camped cell.

A SIB1 may include:

First initial DL BWP configuration (initialDownlinkBWP-RedCap-r17 IE) (optional);

Second initial DL BWP configuration (initialDownlinkBWP);

First PEI configuration (pei-Config-Redcap-r17) (optional); and

Second PEI configuration (pei-Config-r17) (optional).

Embodiment 1-1

If a UE is a RedCap UE:

\*(1) If SIB1 includes initialDownlinkBWP-RedCap-r17 IE (first initial DL BWP configuration) and pagingSearchSpace is configured in this initial DL BWP:

\*\* (2) If a UE supports PEI and pei-Config-Redcap-r17 IE (first PEI configuration) is included in SIB1:

\*\*\* (3) a UE monitors PEI on the DL BWP indicated by initialDownlinkBWP-RedCap (first initial DL BWP configuration) using the parameters in pei-Config-Redcap-r17 IE (first PEI configuration);

\*\* (2) Else

\*\*\* (3) a UE does not monitor PEI;

\*(1) Else (i.e., If SIB1 does not include initialDownlinkBWP-RedCap-r17 IE OR SIB1 include initialDownlinkBWP-RedCap-r17 IE but pagingSearchSpace is not configured in this DL BWP):

\*\* (2) If a UE supports PEI and pei-Config-r17 IE (second PEI configuration) is included in SIB1:

\*\*\* (3) a UE monitors PEI on the DL BWP indicated by initialDownlinkBWP (second initial DL BWP configuration) using the parameters in pei-Config-r17 IE (second PEI configuration);

\*\* (2) Else:

\*\*\* (3) a UE does not monitor PEI.

If a UE is not a RedCap UE:

\*(1) If a UE supports PEI and pei-Config-r17 IE (second PEI configuration) is included in SIB1:

\*\* (2) a UE monitors PEI on the DL BWP indicated by initialDownlinkBWP (second initial DL BWP configuration) using the parameters in pei-Config-r17 IE (second PEI configuration);

*(1) Else:

** (2) a UE does not monitor PEI.

[Embodiment 1-2] (it is Same as Embodiment 1, Except that it Takes into Account Configuration of lastUsedCellOnly)

If a UE is a RedCap UE:

*(1) If SIB1 includes initialDownhnkBWP-RedCap-r17 IE (first initial DL BWP configuration) and paging-SearchSpace is configured in this initial DL BWP:

** (2) If a UE supports PEI and pei-Config-Redcap-r17 IE (first PEI configuration) is included in SIB1 of camped cell:

*** (3) If lastUsedCellOnly is configured in first PEI configuration:

**** (4) If a UE has last entered RRC_IDLE or RRC_INACTIVE in this cell:

***** (5) a UE monitors PEI on the DL BWP indicated by initialDownlinkBWP-RedCap (first initial DL BWP configuration) using the parameters in pei-Config-Redcap-r17 IE (first PEI configuration);

**** (4) If a UE has not last entered RRC_IDLE or RRC_INACTIVE in the cell;

***** (5) a UE does not monitor PEI in this cell;

*** (3) Else If lastUsedCellOnly is not configured in first PEI configuration;

**** (4) a UE monitors PEI on the DL BWP indicated by initialDownlinkBWP-RedCap (first initial DL BWP configuration) using the parameters in pei-Config-Redcap-r17 IE (first PEI configuration);

** (2) Else (i.e., a UE does not support PEI or first PEI configuration is not included):

*** (3) a UE does not monitor PEI;

*(1) Else (i.e., If SIB1 does not include initialDownlinkBWP-RedCap-r17 IE OR SIB1 include initialDownlinkBWP-RedCap-r17 IE but paging-SearchSpace is not configured in this DL BWP):

** (2) If a UE supports PEI and pei-Config-r17 IE (second PEI configuration) is included in SIB1:

*** (3) If lastUsedCellOnly is configured in second PEI configuration:

**** (4) If a UE has last entered RRC_IDLE or RRC_INACTIVE in this cell:

***** (5) a UE monitors PEI on the DL BWP indicated by initialDownlinkBWP (second initial DL BWP configuration) using the parameters in pei-Config-r17 IE (second PEI configuration);

**** (4) If a UE has not last entered RRC_IDLE or

***** (5) a UE does not monitor PEI in this cell

*** (3) Else If lastUsedCellOnly is not configured in second

**** (4) a UE monitors PEI on the DL BWP indicated by initialDownlinkBWP (second initial DL BWP configuration) using the parameters in pei-Config-r17 IE (second PEI configuration);

** (2) Else (i.e., a UE does not support PEI or second PEI configuration is not included):

*** (3) a UE does not monitor PEI.

If a UE is not a RedCap UE:

* (1) If a UE supports PEI and pei-Config-r17 IE (second PEI configuration) is included in SIB1:

** (2) If lastUsedCellOnly is configured in second PEI configuration:

*** (3) If a UE has last entered RRC_IDLE or RRC_INACTIVE in this cell:

**** (4) a UE monitors PEI on the DL BWP indicated by initialDownlinkBWP (second initial DL BWP configuration) using the parameters in pei-Config-r17 IE (second PEI configuration);

*** (3) If a UE has not last entered RRC_IDLE or RRC_INACTIVE in this cell:

**** (4) a UE does not monitor PEI in this cell;

** (2) Else If lastUsedCellOnly is not configured in second PEI configuration:

*** (3) a UE monitors PEI on the DL BWP indicated by initialDownlinkBWP (second initial DL BWP configuration) using the parameters in pei-Config-r17 IE (second PEI configuration);

* (1) Else (i.e., a UE does not support PEI or second PEI configuration is not included): and

** (2) a UE does not monitor PEI.

Embodiment 1-3

If a UE is a RedCap UE:

* (1) If SIB1 includes initialDownlinkBWP-RedCap-r17 IE (first initial DL BWP configuration) and paging-SearchSpace is configured in this initial DL BWP:

** (2) If a UE supports PEI and pei-Config-Redcap-r17 IE (first PEI configuration) is included in SIB1:

*** (3) a UE monitors PEI on the DL BWP indicated by initialDownlinkBWP-RedCap (first initial DL BWP configuration) using the parameters in pei-Config-Redcap-r17 IE (first PEI configuration);

** (2) Else If a UE supports PEI and pei-Config-Redcap-r17 IE (first PEI configuration) is not included in SIB1 and pei-Config-r17 IE (second PEI configuration) is included in SIB1:

*** (3) a UE monitors PEI on the DL BWP indicated by initialDownlinkBWP-RedCap (first initial DL BWP configuration) using the parameters in pei-Config-r17 IE (second PEI configuration);

** (2) Else:

*** (3) a UE does not monitor PEI;

* (1) Else (i.e., If SIB1 does not include initialDownlinkBWP-RedCap-r17 IE OR SIM include initialDownlinkBWP-RedCap-r17 IE but paging-SearchSpace is not configured in this DL BWP):

** (2) If a UE supports PEI and pei-Config-r17 IE (second PEI configuration) is included in SIB1:

*** (3) a UE monitors PEI on the DL BWP indicated by initialDownlinkBWP (second initial DL BWP configuration) using the parameters in pei-Config-r17 IE (second PEI configuration);

** (2) Else: and

*** (3) a UE does not monitor PEI.

If a UE is not a RedCap UE:

* (1) If a UE supports PEI and pei-Config-r17 IE (second PEI configuration) is included in SIB1:

** (2) a UE monitors PEI on the DL BWP indicated by initialDownlinkBWP (second initial DL BWP configuration) using the parameters in pei-Config-r17 IE (second PEI configuration); and

* (1) Else:

** (2) a UE does not monitor PEI.

The advantage of embodiment 1-3 over embodiment 1-1 is that in case network wants to use same PEI configuration for redcap and non-redcap BWP, the network can skip first PEI configuration and reduce signalling overhead. The advantage of embodiment 1-1 over embodiment 1-3 is that network can provide different configuration for redcap and non-redcap BWP, network can support PEI on one of redcap and non-redcap BWP, if the network wants. In embodiment 1-3, if PEI is supported for non-redcap BWP, it is always supported for redcap BWP irrespective of first PEI configuration is signalled or not.

[Embodiment 1-4] (it is Same as Embodiment 3, Except that it Takes into Account Configuration of lastUsedCellOnly)

If a UE is a RedCap UE:
* (1) If SIB1 includes initialDownhnkBWP-RedCap-r17 IE (first initial DL BWP configuration) and paging-SearchSpace is configured in this initial DL BWP:
** (2) If a UE supports PEI and pei-Config-Redcap-r17 IE (first PEI configuration) is included in SIB1 of camped cell:
*** (3) If lastUsedCellOnly is configured in first PEI configuration:
**** (4) If a UE has last entered RRC_IDLE or RRC_INACTIVE in this cell:
***** (5) a UE monitors PEI on the DL BWP indicated by initialDownlinkBWP-RedCap (first initial DL BWP configuration) using the parameters in pei-Config-Redcap-r17 IE (first PEI configuration);
**** (4) If a UE has not last entered RRC_IDLE or RRC_INACTIVE in this cell:
***** (5) a UE does not monitor PEI in this cell;
*** (3) Else If lastUsedCellOnly is not configured in first PEI configuration:
**** (4) a UE monitors PEI on the DL BWP indicated by initialDownlinkBWP-RedCap (first initial DL BWP configuration) using the parameters in pei-Config-Redcap-r17 IE (first PEI configuration);
** (2) Else If a UE supports PEI and pei-Config-Redcap-r17 IE (first PEI configuration) is not included in SIB1 and pei-Config-r17 IE (second PEI configuration) is included in SIB1:
*** (3) If lastUsedCellOnly is configured in second PEI configuration:
**** (4) If a UE has last entered RRC_IDLE or RRC_INACTIVE in this cell:
***** (5) a UE monitors PEI on the DL BWP indicated by initialDownlinkBWP-RedCap (first initial DL BWP configuration) using the parameters in pei-Config-r17 IE (second PEI configuration);
**** (4) If a UE has not last entered RRC_IDLE or RRC_INACTIVE in this cell:
***** (5) a UE does not monitor PEI in this cell;
*** (3) Else If lastUsedCellOnly is not configured in second PEI configuration:
**** (4) a UE monitors PEI on the DL BWP indicated by initialDownlinkBWP-RedCap (first initial DL BWP configuration) using the parameters in pei-Config-r17 IE (second PEI configuration);

** (2) Else (i.e., a UE does not support PEI or both first PEI configuration and second PEI configuration is not included):
*** (3) a UE does not monitor PEI;
* (1) Else (i.e., If SIB1 does not include initialDown-linkBWP-RedCap-r17 IE OR SIB1 include initial-DownlinkBWP-RedCap-r17 IE but paging-SearchSpace is not configured in this DL BWP):
** (2) If a UE supports PEI and pei-Config-r17 IE (second PEI configuration) is included in SIB1:
*** (3) If lastUsedCellOnly is configured in second PEI configuration:
**** (4) If a UE has last entered RRC_IDLE or RRC_INACTIVE in this cell:
***** (5) a UE monitors PEI on the DL BWP indicated by initialDownlinkBWP (second initial DL BWP configuration) using the parameters in pei-Config-r17 IE (second PEI configuration);
**** (4) If a UE has not last entered RRC_IDLE or RRC_INACTIVE in this cell:
***** (5) a UE does not monitor PEI in this cell;
*** (3) Else If lastUsedCellOnly is not configured in second PEI configuration:
**** (4) a UE monitors PEI on the DL BWP indicated by initialDownlinkBWP (second initial DL BWP configuration) using the parameters in pei-Config-r17 IE (second PEI configuration);
** (2) Else (i.e., a UE does not support PEI or second PEI configuration is not included):
*** (3) a UE does not monitor PEI.
If a UE is not a RedCap UE:
* (1) If a UE supports PEI and pei-Config-r17 IE (second PEI configuration) is included in SIB1:
** (2) If lastUsedCellOnly is configured in second PEI configuration:
*** (3) If a UE has last entered RRC_IDLE or RRC_INACTIVE in this cell:
**** (4) a UE monitors PEI on the DL BWP indicated by initialDownlinkBWP (second initial DL BWP configuration) using the parameters in pei-Config-r17 IE (second PEI configuration);
*** (3) If a UE has not last entered RRC_IDLE or RRC_INACTIVE in this cell:
**** (4) a UE does not monitor PEI in this cell;
** (2) Else If lastUsedCellOnly is not configured in second PEI configuration:
*** (3) a UE monitors PEI on the DL BWP indicated by initialDownlinkBWP (second initial DL BWP configuration) using the parameters in pei-Config-r17 IE (second PEI configuration);
* (1) Else (i.e., UE does not support PEI or second PEI configuration is not included):
** (2) a UE does not monitor PEI.

Embodiment 2

FIG. 5 and FIG. 6 illustrate other examples of PEI configuration in accordance with embodiments of the present disclosure.

In this embodiment of the disclosure, it is provided to remove pei-SearchSpace-r17 from PEI-Config-r17 and remove firstPDCCH-MonitoringOccasionOfPEI-O-r17 from PEI-Config-r17 as shown in 500 in FIG. 5. It is provided to add pei-SearchSpace-r17 and firstPDCCH-MonitoringOccasionOfPEI-O-r17 in SIB1→ServingCell ConfigCommonSIB→DownlinkConfigCommonSIB-→initialDownlinkBWP→BWP-DownlinkCommon-→PDCCH-ConfigCommon as shown in 600 in FIG. 6. It is also provided to add pei-SearchSpace-r17 and firstPDCCH-MonitoringOccasionOfPEI-O-r17 in SIB1→ServingCell ConfigCommonSIB→DownlinkConfigCommonSIB-→initialDownlinkBWP-RedCap-r17→BWP-Downlink-Common→PDCCH-ConfigCommon as shown in 600 in FIG. 6. This method has reduced signalling overhead as some parameters are commonly signalled for both redcap and non-redcap initial DL BWP. Only pei-SearchSpace-r17 and firstPDCCH-MonitoringOccasionOfPEI-O-r17 are signalled per BWP.

The condition "Cond X" in FIG. 6 means that these parameters are optionally included in PDCCH config common of initialDownhnkBWP/initialDownhnkBWP-RedCap if pei-Config-r17 IE is included in SIB1 and paging-SearchSpace is configured in the initialDownhnkBWP/initialDownhnkBWP-RedCap. It is not included in PDCCH config common of other DL BWPs.

A UE is in RRC_IDLE or RRC_INACTIVE:

A UE acquires SIB1 from the camped cell.

A SIB1 may include:

First initial DL BWP configuration (initialDownlinkBWP-RedCap-r17 IE) (optional);

Second initial DL BWP configuration (initialDownlinkBWP);

Common PEI configuration (pei-Config-r17) (optional), applied for all initial DL BWPs (i.e., initialDownlinkBWP, initialDownhnkBWP-RedCap-r17):

po-NumPerPEI-r17; payloadSizeDCI-2-7-r17; pei-FrameOffset-r17; subgroupConfig-r17 (sub-groupsNumPerPO-r17, subgroupsNumForUEID-r17); lastUsedCellOnly-r17;

BWP specific PEI configuration for initial DL BWP where initial DL BWP is indicated by initialDownhnkBWP-RedCap-r17 (optional):

BWP specific PEI configuration includes pei-SearchSpace and firstPDCCH-MonitoringOccasion-OfPEI-O. pei-SearchSpace and firstPDCCH-MonitoringOccasionOfPEI-O are included in PDCCH config common configuration of the initial-DownhnkBWP-RedCap-r17; and BWP specific PEI configuration for initial DL BWP where initial DL BWP is indicated by initialDownlinkBWP (optional):

BWP specific PEI configuration includes pei-SearchSpace and firstPDCCH-MonitoringOccasion-OfPEI-O. pei-SearchSpace and firstPDCCH-MonitoringOccasionOfPEI-O are included in PDCCH config common configuration of the initial-DownhnkBWP In an embodiment, pei-FrameOffset-r17 can be included in BWP specific PEI configuration instead of common PEI configuration.

Embodiment 2-1

If a UE is a RedCap UE:

* (1) If SIB1 includes innialDownhnkBWP-RedCap-r17 IE (first initial DL BWP configuration) and paging-SearchSpace is configured in this initial DL BWP:

** (2) If a UE supports PEI and pei-Config-r17 IE (common PEI configuration) is included in SIB1:

*** (3) a UE monitors PEI on the DL BWP indicated by initialDownlinkBWP-RedCap (first initial DL BWP configuration) using the:

**** (4) Common parameters configured in pei-Config-r17 IE; and

**** (4) BWP specific parameters: pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap). In an embodiment, if pei-FrameOffset-r17 is included in BWP specific PEI configuration instead of common PEI configuration, a UE uses pei-FrameOffset-r17 corresponding to initialDownlinkBWP-Red-Cap.

** (2) Else:

*** (3) a UE does not monitor PEI;

* (1) Else (i.e., If SIB1 does not include initialDown-linkBWP-RedCap-r17 IE OR SIB1 include initial-DownlinkBWP-RedCap-r17 IE but paging-SearchSpace is not configured in this DL BWP):

** (2) If a UE supports PEI and pei-Config-r17 IE is included in SIB 1:

*** (3) a UE monitors PEI on the DL BWP indicated by initialDownlinkBWP (second initial DL BWP configuration) using the:

**** (4) Common parameters configured in pei-Config-r17 IE; and

**** (4) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDown-linkBWP; and

**** (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

** (2) Else:

*** (3) a UE does not monitor PEI.

If a UE is not a RedCap UE:

* (1) If UE supports PEI and pei-Config-r17 IE is included in SIB1:

** (2) a UE monitors PEI on the DL BWP indicated by initialDownlinkBWP (second initial DL BWP configuration) using the:

*** (3) Common parameters configured in pei-Config-r17 IE; and

*** (3) BWP specific parameters: pei-SearchSpace-r17 and firstPDCCH-MonitoringOccasionOfPEI-O-r17 corresponding to initialDownlinkBWP (i.e., configured in BWP configuration of initialDown-linkBWP). In an embodiment, if pei-FrameOffset-r17 is included in BWP specific PEI configuration instead of common PEI configuration, a UE uses pei-FrameOffset-r17 corresponding to initial-DownlinkBWP; and

*** (3) If pei-SearchSpace-r17 and firstPDCCH-MonitoringOccasionOfPEI-O-r17 corresponding to initialDownlinkBWP is not configured (i.e., not configured in BWP configuration of initialDown-linkBWP), a UE does not monitor PEI;
* (1) Else:
** (2) a UE does not monitor PEI.

[Embodiment 2-2] (it is Same as Embodiment 1, Except that it Takes into Account Configuration of lastUsedCellOnly)

If a UE is a RedCap UE:
* (1) If SIB1 includes initialDownlinkBWP-RedCap-r17 IE (first initial DL BWP configuration) and paging-SearchSpace is configured in this initial DL BWP:
** (2) If a UE supports PEI and pei-Config-r17 IE (common PEI configuration) is included in SIB1 of camped cell:
*** (3) If lastUsedCellOnly is configured in com-mon PEI configuration:
**** (4) If a UE has last entered RRC_IDLE or RRC_INACTIVE in this cell:
***** (5) a UE monitors PEI on the DL BWP indicated by initialDownlinkBWP-RedCap (first initial DL BWP configuration) using the:
****** (6) Common parameters configured in pei-Config-r17 IE; and
****** (6) BWP specific parameters: pei-SearchSpace-r17 and firstPDCCH-Monitorin-gOccasionOfPEI-O-r17 corresponding to ini-tialDownlinkBWP-RedCap (i.e., configured in BWP configuration of initialDownlinkBWP-RedCap). In an embodiment, if pei-FrameOff-set-r17 is included in BWP specific PEI con-figuration instead of common PEI configuration, a UE uses pei-FrameOffset-r17 corresponding to initialDownlinkBWP-Red-Cap;
**** (4) If a UE has not last entered RRC_IDLE or RRC_INACTIVE in this cell:
***** (5) a UE does not monitor PEI in this cell;
*** (3) Else If lastUsedCellOnly is not configured in first PEI configuration:
**** (4) a UE monitors PEI on the DL BWP indicated by initialDownlinkBWP-RedCap (first initial DL BWP configuration) using the:
***** (5) Common parameters configured in pei-Config-r17 IE; and
***** (5) BWP specific parameters: pei-SearchSpace-r17 and firstPDCCH-Monitorin-gOccasionOfPEI-O-r17 corresponding to ini-tialDownlinkBWP-RedCap (i.e., configured in BWP configuration of initialDownlinkBWP-RedCap). In an embodiment, if pei-FrameOff-set-r17 is included in BWP specific PEI con-figuration instead of common PEI configuration, a UE uses pei-FrameOffset-r17 corresponding to initialDownlinkBWP-Red-Cap;
** (2) Else (i.e., a UE does not support PEI or first PEI configuration is not included):
*** (3) a UE does not monitor PEI;
* (1) Else (i.e., If SIB1 does not include initialDown-linkBWP-RedCap-r17 IE OR SIM include initial-DownlinkBWP-RedCap-r17 IE but paging-SearchSpace is not configured in this DL BWP):
** (2) If a UE supports PEI and pei-Config-r17 IE (common PEI configuration) is included in SIB1:

*** (3) If lastUsedCellOnly is configured in com-mon PEI configuration:
**** (4) If a UE has last entered RRC_IDLE or RRC_INACTIVE in this cell:
***** (5) a UE monitors PEI on the DL BWP indicated by initialDownlinkBWP (second ini-tial DL BWP configuration) using the:
****** (6) Common parameters configured in pei-Config-r17 IE;
****** (6) BWP specific parameters: pei-SearchSpace-r17 and firstPDCCH-Monitorin-gOccasionOfPEI-O-r17 corresponding to ini-tialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDown-linkBWP; and
****** (6) If pei-SearchSpace-r17 and firstPDCCH-MonitoringOccasionOfPEI-O-r17 corresponding to initialDownlinkBWP is not configured (i.e., not configured in BWP con-figuration of initialDownlinkBWP), a UE does not monitor PEI;
**** (4) If a UE has not last entered RRC_IDLE or RRC_INACTIVE in this cell:
***** (5) a UE does not monitor PEI in this cell;
*** (3) Else If lastUsedCellOnly is not configured in second PEI configuration:
**** (4) a UE monitors PEI on the DL BWP indicated by initialDownlinkBWP (second ini-tial DL BWP configuration) using the:
***** (5) Common parameters configured in pei-Config-r17 IE;
***** (5) BWP specific parameters: pei-SearchSpace-r17 and firstPDCCH-Monitorin-gOccasionOfPEI-O-r17 corresponding to ini-tialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDown-linkBWP; and
***** (5) If pei-SearchSpace-r17 and firstPDCCH-MonitoringOccasionOfPEI-O-r17 corresponding to initialDownlinkBWP is not configured (i.e., not configured in BWP con-figuration of initialDownlinkBWP), a UE does not monitor PEI;
** (2) Else (i.e., a UE does not support PEI or second PEI configuration is not included);
*** (3) a UE does not monitor PEI.
If a UE is not a RedCap UE:
* (1) If a UE supports PEI and pei-Config-r17 IE (com-mon PEI configuration) is included in SIB1:
** (2) If lastUsedCellOnly is configured in common PEI configuration:
*** (3) If a UE has last entered RRC_IDLE or RRC_INACTIVE in this cell:
**** (4) a UE monitors PEI on the DL BWP indicated by initialDownlinkBWP (second ini-tial DL BWP configuration) using the:
***** (5) Common parameters configured in pei-Config-r17 IE;

\*\*\*\*\* (5) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\*\* (5) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\*\*\* (3) If a UE has not last entered RRC_IDLE or RRC_INACTIVE in this cell:

\*\*\*\* (4) a UE does not monitor PEI in this cell;

\*\* (2) Else If lastUsedCellOnly is not configured in second PEI configuration:

\*\*\* (3) a UE monitors PEI on the DL BWP indicated by initialDownlinkBWP (second initial DL BWP configuration) using the:

\*\*\*\* (4) Common parameters configured in pei-Config-r17 IE;

\*\*\*\* (4) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\* (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\* (1) Else (i.e., a UE does not support PEI or second PEI configuration is not included):

\*\* (2) a UE does not monitor PEI.

Embodiment 2-3

If a UE is a RedCap UE:

\* (1) If SIB1 includes initialDownlinkBWP-RedCap-r17 IE (first initial DL BWP configuration) and paging-SearchSpace is configured in this initial DL BWP:

\*\* (2) If a UE supports PEI and pei-Config-r17 IE (common PEI configuration) is included in SIB1:

\*\*\* (3) a UE monitors PEI on the DL BWP indicated by initialDownlinkBWP-RedCap (first initial DL BWP configuration) using the:

\*\*\*\* (4) Common parameters configured in pei-Config-r17 IE; and

\*\*\*\* (4) If pei-SearchSpace-r17 and firstPDCCH-MonitoringOccasionOfPEI-O-r17 are configured for initialDownlinkBWP-RedCap:

\*\*\*\*\* (5) Use pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap). In an embodiment, if pei-FrameOffset-r17 is included in BWP specific PEI configuration instead of common PEI configuration, a UE uses pei-FrameOffset-r17 corresponding to initialDownlinkBWP-RedCap;

\*\*\*\* (4) Else:

\*\*\*\*\* (5) Use pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\*\* (5) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\*\* (2) Else:

\*\*\* (3) a UE does not monitor PEI;

\* (1) Else (i.e., If SIB1 does not include initialDownlinkBWP-RedCap-r17 IE OR SIM include initialDownlinkBWP-RedCap-r17 IE but paging-SearchSpace is not configured in this DL BWP):

\*\* (2) If a UE supports PEI and pei-Config-r17 IE is included in SIB 1:

\*\*\* (3) a UE monitors PEI on the DL BWP indicated by initialDownlinkBWP (second initial DL BWP configuration) using the:

\*\*\*\* (4) Common parameters configured in pei-Config-r17 IE;

\*\*\*\* (4) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\* (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\*\* (2) Else:

\*\*\* (3) UE does not monitor PEI.

If a UE is not a RedCap UE:

\* (1) If a UE supports PEI and pei-Config-r17 IE is included in SIB1:

\*\* (2) a UE monitors PEI on the DL BWP indicated by initialDownlinkBWP (second initial DL BWP configuration) using the:

\*\*\* (3) Common parameters configured in pei-Config-r17 IE;

\*\*\* (3) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration

US 12,696,301 B2

27 instead of common PEI configuration, a UE uses pei-FrameOffset-r17 corresponding to initialDownlinkBWP; and \*\*\* (3) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\* (1) Else:

\*\* (2) a UE does not monitor PEI.

[Embodiment 2-4] (it is Same as Embodiment 3, Except that it Takes into Account Configuration of lastUsedCellOnly)

If a UE is a RedCap UE:

\* (1) If SIB1 includes initialDownhnkBWP-RedCap-r17 IE (first initial DL BWP configuration) and paging-SearchSpace is configured in this initial DL BWP:

\*\* (2) If a UE supports PEI and pei-Config-r17 IE (common PEI configuration) is included in SIB1 of camped cell:

\*\*\* (3) If lastUsedCellOnly is configured in common PEI configuration:

\*\*\*\* (4) If a UE has last entered RRC_IDLE or RRC_INACTIVE in this cell:

\*\*\*\*\* (5) a UE monitors PEI on the DL BWP indicated by initialDownlinkBWP-RedCap (first initial DL BWP configuration) using the:

\*\*\*\*\*\* (6) Common parameters configured in pei-Config-r17 IE; and

\*\*\*\*\*\* (6) If pei-SearchSpace-r17 and firstPDCCH-MonitoringOccasionOfPEI-O-r17 are configured for initialDownlinkBWP-RedCap:

\*\*\*\*\*\*\* (7) Use pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap). In an embodiment, if pei-FrameOffset-r17 is included in BWP specific PEI configuration instead of common PEI configuration, a UE uses pei-FrameOffset-r17 corresponding to initialDownlinkBWP-RedCap;

\*\*\*\*\*\* (6) Else:

\*\*\*\*\*\*\* (7) Use pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\*\*\*\* (7) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\*\*\*\* (4) If a UE has not last entered RRC_IDLE or RRC_INACTIVE in this cell:

\*\*\*\*\* (5) a UE does not monitor PEI in this cell;

\*\*\* (3) Else If lastUsedCellOnly is not configured in first PEI configuration:

28

\*\*\*\* (4) a UE monitors PEI on the DL BWP indicated by initialDownlinkBWP-RedCap (first initial DL BWP configuration) using the:

\*\*\*\*\* (5) Common parameters configured in pei-Config-r17 IE; and

\*\*\*\*\* (5) If pei-SearchSpace-r17 and firstPDCCH-MonitoringOccasionOfPEI-O-r17 are configured for initialDownlinkBWP-RedCap:

\*\*\*\*\*\* (6) Use pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap). In an embodiment, if pei-FrameOffset-r17 is included in BWP specific PEI configuration instead of common PEI configuration, a UE uses pei-FrameOffset-r17 corresponding to initialDownlinkBWP-RedCap;

\*\*\*\*\* (5) Else:

\*\*\*\*\*\* (6) Use pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\*\*\* (6) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\*\* (2) Else (i.e., a UE does not support PEI or first PEI configuration is not included):

\*\*\* (3) a UE does not monitor PEI;

\* (1) Else (i.e., If SIB1 does not include initialDownlinkBWP-RedCap-r17 IE OR SIM include initialDownlinkBWP-RedCap-r17 IE but paging-SearchSpace is not configured in this DL BWP):

\*\* (2) If a UE supports PEI and pei-Config-r17 IE (common PEI configuration) is included in SIB1:

\*\*\* (3) If lastUsedCellOnly is configured in common PEI configuration:

\*\*\*\* (4) If a UE has last entered RRC_IDLE or RRC_INACTIVE in this cell:

\*\*\*\*\* (5) a UE monitors PEI on the DL BWP indicated by initialDownlinkBWP (second initial DL BWP configuration) using the:

\*\*\*\*\*\* (6) Common parameters configured in pei-Config-r17 IE;

\*\*\*\*\*\* (6) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and \*\*\*\*\*\* (6) If pei-SearchSpace-r17 and firstPDCCH-MonitoringOccasionOfPEI-O-r17 corresponding to initialDownlinkBWP is not configured (i.e., not configured in BWP con-
figuration of initialDownlinkBWP), a UE does
not monitor PEI;
    **** (4) If a UE has not last entered RRC_IDLE
or RRC_INACTIVE in this cell:
      ***** (5) a UE does not monitor PEI in this
cell;
  *** (3) Else If lastUsedCellOnly is not configured in
second PEI configuration:
    **** (4) a UE monitors PEI on the DL BWP
indicated by initialDownlinkBWP (second ini-
tial DL BWP configuration) using the:
      ***** (5) Common parameters configured in
pei-Config-r17 IE;
      ***** (5) BWP specific parameters: pei-
SearchSpace-r17 and firstPDCCH-Monitorin-
gOccasionOfPEI-O-r17 corresponding to ini-
tialDownlinkBWP (i.e., configured in BWP
configuration of initialDownlinkBWP). In an
embodiment, if pei-FrameOffset-r17 is included
in BWP specific PEI configuration instead of
common PEI configuration, a UE uses pei-
FrameOffset-r17 corresponding to initialDown-
linkBWP; and
      ***** (5) If pei-SearchSpace-r17 and
firstPDCCH-MonitoringOccasionOfPEI-O-r17
corresponding to initialDownlinkBWP is not
configured (i.e., not configured in BWP con-
figuration of initialDownlinkBWP), a UE does
not monitor PEI;
  ** (2) Else (i.e., a UE does not support PEI or second
PEI configuration is not included):
    *** (3) a UE does not monitor PEI.
If a UE is not a RedCap UE:
  * (1) If a UE supports PEI and pei-Config-r17 IE (com-
mon PEI configuration) is included in SIB1:
  ** (2) If lastUsedCellOnly is configured in common
PEI configuration:
    *** (3) If a UE has last entered RRC_IDLE or
RRC_INACTIVE in this cell:
    **** (4) a UE monitors PEI on the DL BWP
indicated by initialDownlinkBWP (second ini-
tial DL BWP configuration) using the:
      ***** (5) Common parameters configured in
pei-Config-r17 IE;
      ***** (5) BWP specific parameters: pei-
SearchSpace-r17 and firstPDCCH-Monitorin-
gOccasionOfPEI-O-r17 corresponding to ini-
tialDownlinkBWP (i.e., configured in BWP
configuration of initialDownlinkBWP). In an
embodiment, if pei-FrameOffset-r17 is included
in BWP specific PEI configuration instead of
common PEI configuration, a UE uses pei-
FrameOffset-r17 corresponding to initialDown-
linkBWP; and
      ***** (5) If pei-SearchSpace-r17 and
firstPDCCH-MonitoringOccasionOfPEI-O-r17
corresponding to initialDownlinkBWP is not
configured (i.e., not configured in BWP con-
figuration of initialDownlinkBWP), a UE does
not monitor PEI;
    *** (3) If a UE has not last entered RRC_IDLE or
RRC_INACTIVE in this cell:
    **** (4) a UE does not monitor PEI in this cell;
  ** (2) Else If lastUsedCellOnly is not configured in
second PEI configuration;

*** (3) a UE monitors PEI on the DL BWP indicated
by initialDownlinkBWP (second initial DL BWP
configuration) using the:
    **** (4) Common parameters configured in pei-
Config-r17 IE;
    **** (4) BWP specific parameters: pei-
SearchSpace-r17 and firstPDCCH-Monitorin-
gOccasionOfPEI-O-r17 corresponding to ini-
tialDownlinkBWP (i.e., configured in BWP
configuration of initialDownlinkBWP). In an
embodiment, if pei-FrameOffset-r17 is included
in BWP specific PEI configuration instead of
common PEI configuration, a UE uses pei-
FrameOffset-r17 corresponding to initialDown-
linkBWP; and
    **** (4) If pei-SearchSpace-r17 and firstPDCCH-
MonitoringOccasionOfPEI-O-r17 correspond-
ing to initialDownlinkBWP is not configured
(i.e., not configured in BWP configuration of
initialDownlinkBWP), a UE does not monitor
PEI;
 * (1) Else (i.e., a UE does not support PEI or second PEI
configuration is not included):
  ** (2) a UE does not monitor PEI.

Embodiment 2-5

If a UE is a RedCap a UE:
 * (1) If SIB1 includes initialDownlinkBWP-RedCap-r17
IE (first initial DL BWP configuration) and paging-
SearchSpace is configured in this initial DL BWP:
  ** (2) If a UE supports PEI and pei-Config-r17 IE
(common PEI configuration) is included in SIB1:
    *** (3) a UE monitors PEI on the DL BWP indicated
by initialDownlinkBWP-RedCap (First initial DL
BWP configuration) using the:
    **** (4) Common parameters configured in pei-
Config-r17 IE; and
    **** (4) If pei-SearchSpace-r17 and firstPDCCH-
MonitoringOccasionOfPEI-O-r17 are config-
ured for initialDownlinkBWP-RedCap:
      ***** (5) Use pei-SearchSpace-r17 and
firstPDCCH-MonitoringOccasionOfPEI-O-r17
corresponding to initialDownlinkBWP-RedCap
(i.e., configured in BWP configuration of ini-
tialDownlinkBWP-RedCap). In an embodi-
ment, if pei-FrameOffset-r17 is included in
BWP specific PEI configuration instead of com-
mon PEI configuration, a UE uses pei-
FrameOffset-r17 corresponding to initialDown-
linkBWP-RedCap;
    **** (4) Else:
      ***** (5) a UE does not monitor PEI;
  ** (2) Else:
    *** (3) a UE does not monitor PEI;
 * (1) Else (i.e., If SIB1 does not include initialDown-
linkBWP-RedCap-r17 IE OR SIM include initial-
DownlinkBWP-RedCap-r17 IE but paging-
SearchSpace is not configured in this DL BWP):
  ** (2) If a UE supports PEI and pei-Config-r17 IE is
included in SIB 1:
    *** (3) a UE monitors PEI on the DL BWP indicated
by initialDownlinkBWP (second initial DL BWP
configuration) using the:
    **** (4) Common parameters configured in pei-
Config-r17 IE; and \*\*\*\* (4) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP) In an embodiment, if pei-FrameOffset-r17 is included in BWP specific PEI configuration instead of common PEI configuration, a UE uses pei-FrameOffset-r17 corresponding to initialDownlinkBWP;

\*\* (2) Else:

\*\*\* (3) a UE does not monitor PEI.

If a UE is not a RedCap UE:

\* (1) If a UE supports PEI and pei-Config-r17 IE is included in SIB1:

\*\* (2) a UE monitors PEI on the DL BWP indicated by initialDownlinkBWP (second initial DL BWP configuration) using the:

\*\*\* (3) Common parameters configured in pei-Config-r17 IE; and

\*\*\* (3) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP:

\*\*\*\* (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

\* (1) Else:

\*\* (2) a UE does not monitor PEI.

[Embodiment 2-6] (it is Same as Embodiment 1, Except that it Takes into Account Configuration of lastUsedCellOnly)

If a UE is a RedCap UE:

\* (1) If a SIB1 includes initialDownlinkBWP-RedCap-r17 IE (first initial DL BWP configuration) and pagingSearchSpace is configured in this initial DL BWP:

\*\* (2) If a UE supports PEI and pei-Config-r17 IE (common PEI configuration) is included in SIB1 of camped cell:

\*\*\* (3) If lastUsedCellOnly is configured in common PEI configuration:

\*\*\*\* (4) If a UE has last entered RRC_IDLE or RRC_INACTIVE in this cell:

\*\*\*\*\* (5) a UE monitors PEI on the DL BWP indicated by initialDownlinkBWP-RedCap (first initial DL BWP configuration) using the:

\*\*\*\*\*\* (6) Common parameters configured in pei-Config-r17 IE; and

\*\*\*\*\*\* (6) If pei-SearchSpace-r17 and firstPDCCH-MonitoringOccasionOfPEI-O-r17 are configured for initialDownlinkBWP-RedCap:

\*\*\*\*\*\*\* (7) Use pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap). In an embodiment, if pei-FrameOffset-r17 is included in BWP specific PEI configuration instead of common PEI configuration, a UE uses pei-FrameOffset-r17 corresponding to initialDownlinkBWP-RedCap;

\*\*\*\*\*\* (6) Else:

\*\*\*\*\*\*\* (7) a UE does not monitor PEI;

\*\*\*\* (4) If a UE has not last entered RRC_IDLE or RRC_INACTIVE in this cell:

\*\*\*\*\* (5) a does not monitor PEI in this cell;

\*\*\* (3) Else If lastUsedCellOnly is not configured in first PEI configuration:

\*\*\*\* (4) a UE monitors PEI on the DL BWP indicated by initialDownlinkBWP-RedCap (first initial DL BWP configuration) using the:

\*\*\*\*\* (5) Common parameters configured in pei-Config-r17 IE; and

\*\*\*\*\* (5) If pei-SearchSpace-r17 and firstPDCCH-MonitoringOccasionOfPEI-O-r17 are configured for initialDownlinkBWP-RedCap:

\*\*\*\*\*\* (6) Use pei-SearchSpace-r17 and firstPDCCH-MonitoringOccasionOfPEI-O-r17 corresponding to initialDownlinkBWP-RedCap (i.e., configured in BWP configuration of initialDownlinkBWP-RedCap) In an embodiment, if pei-FrameOffset-r17 is included in BWP specific PEI configuration instead of common PEI configuration, a UE uses pei-FrameOffset-r17 corresponding to initialDownlinkBWP-RedCap;

\*\*\*\*\* (5) Else:

\*\*\*\*\*\* (6) a UE does not monitor PEI;

\*\* (2) Else (i.e., a UE does not support PEI or first PEI configuration is not included);

\*\*\* (3) a UE does not monitor PEI;

\* (1) Else (i.e., If SIB1 does not include initialDownlinkBWP-RedCap-r17 IE OR SIM include initialDownlinkBWP-RedCap-r17 IE but pagingSearchSpace is not configured in this DL BWP):

\*\* (2) If a UE supports PEI and pei-Config-r17 IE (common PEI configuration) is included in SIB1:

\*\*\* (3) If lastUsedCellOnly is configured in common PEI configuration:

\*\*\*\* (4) If a UE has last entered RRC_IDLE or RRC_INACTIVE in this cell:

\*\*\*\*\* (5) a UE monitors PEI on the DL BWP indicated by initialDownlinkBWP (second initial DL BWP configuration) using the:

\*\*\*\*\*\* (6) Common parameters configured in pei-Config-r17 IE; and

\*\*\*\*\*\* (6) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP;

\*\*\*\* (4) If a UE has not last entered RRC_IDLE or RRC_INACTIVE in this cell:

\*\*\*\*\* (5) a UE does not monitor PEI in this cell;

\*\*\* (3) Else If lastUsedCellOnly is not configured in second PEI configuration:

**** (4) a UE monitors PEI on the DL BWP indicated by initialDownlinkBWP (second initial DL BWP configuration) using the:

***** (5) Common parameters configured in pei-Config-r17 IE; and

***** (5) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP;

** (2) Else (i.e., a UE does not support PEI or second PEI configuration is not included):

*** (3) a UE does not monitor PEI.

If a UE is not a RedCap UE:

* (1) If a UE supports PEI and pei-Config-r17 IE (common PEI configuration) is included in SIB1:

** (2) If lastUsedCellOnly is configured in common PEI configuration:

*** (3) If a UE has last entered RRC_IDLE or RRC_INACTIVE in this cell:

**** (4) a UE monitors PEI on the DL BWP indicated by initialDownlinkBWP (second initial DL BWP configuration) using the:

***** (5) Common parameters configured in pei-Config-r17 IE; and

***** (5) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP;

**** (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

*** (3) If a UE has not last entered RRC_IDLE or RRC_INACTIVE in this cell:

**** (4) a UE does not monitor PEI in this cell;

** (2) Else If lastUsedCellOnly is not configured in second PEI configuration:

*** (3) a UE monitors PEI on the DL BWP indicated by initialDownlinkBWP (second initial DL BWP configuration) using the:

**** (4) Common parameters configured in pei-Config-r17 IE;

**** (4) BWP specific parameters: pei-SearchSpace-r17 and firstPDCCH-MonitoringOccasionOfPEI-O-r17 corresponding to initialDownlinkBWP (i.e., configured in BWP configuration of initialDownlinkBWP). In an embodiment, if pei-FrameOffset-r17 is included in BWP specific PEI configuration instead of common PEI configuration, a UE uses pei-FrameOffset-r17 corresponding to initialDownlinkBWP; and

**** (4) If pei-SearchSpace-r17 and firstPDCCH-MonitoringOccasionOfPEI-O-r17 corresponding to initialDownlinkBWP is not configured (i.e., not configured in BWP configuration of initialDownlinkBWP), a UE does not monitor PEI;

* (1) Else (i.e., a UE does not support PEI or second PEI configuration is not included):

** (2) a UE does not monitor PEI

Embodiment 3

FIG. 7 and FIG. 8 illustrate other examples of PEI configuration in accordance with embodiments of the present disclosure.

In this embodiment of the disclosure, it is provided to introduce a new field/IE "pei-Config-Redcap-r17" in SIB1. The "pei-Config-Redcap-r17" is of type PEI-ConfigRedcap-r17 (as shown in 800 in FIG. 8). PEI-ConfigRedcap-r17 includes pei-SearchSpace-r17 and firstPDCCH-MonitoringOccasionOfPEI-O-r17. In the SIM it can be included in the IE DownhnkConfigCommonSIB (SIB1→ServingCell ConfigCommonSIB→DownhnkConfigCommonSIB) as shown in 700 in FIG. 7.

In an embodiment, a gnB includes pei-Config-Redcap-r17 in SIM if initialDownlinkBWP-RedCap-r17 is included in SIB1 and pagingSearchSpace is configured for this BWP, Otherwise not. In another embodiment, a gnB includes pei-Config-Redcap-r17 in SIB1 if initialDownlinkBWP-RedCap-r17 is included in SIB1, Otherwise not. SIM also include pei-Config-r17 of type PEI-Config-r17. PEI-Config-r17 includes po-NumPerPEI-r17; payloadSizeDCI-2-7-r17; pei-FrameOffset-r17; subgroupConfig-r17 (subgroups NumPerPO-r17, subgroupsNumForUEID-r17); lastUsedCellOnly-r17, pei-SearchSpace-r17 and firstPDCCH-MonitoringOccasionOfPEI-O-r17. In an embodiment, pei-FrameOffset-r17; can also be included in PEI-Config Redcap-r17 and in the case where a UE uses pei-SearchSpace-r17 and firstPDCCH-MonitoringOccasionOfPEI-O-r17 from a PEI-ConfigRedcap-r17 UE also uses pei-FrameOffset-r17 from PEI-ConfigRedcap-r17.

The advantage of embodiment 3 is that change to existing PEI configuration is not needed. Only the parameters which needs to be configured specific to redcap specific BWP are added separately in SIB1. There is no impact to BWP configuration.

A UE is in RRC_IDLE or RRC_INACTIVE:

A UE acquires SIB1 from the camped cell.

A SIB1 may include:

First initial DL BWP configuration (initialDownlinkBWP-RedCap-r17 IE) (optional);

Second initial DL BWP configuration (initialDownhnkBWP);

First PEI configuration (pei-Config-Redcap-r17 of type PEI-ConfigRedcap-r17) (optional); and/or Second PEI configuration (pei-Config-r17 of type PEI-Config-r17) (optional).

Embodiment 3-1

If a UE is a RedCap UE:

* (1) If SIB1 includes initialDownhnkBWP-RedCap-r17 IE (first initial DL BWP configuration) and pagingSearchSpace is configured in this initial DL BWP:

35

** (2) If a UE supports PEI and pei-Config-Redcap-r17 IE (first PEI configuration) and pei-Config-r17 IE (second PEI configuration) is included in SIB1:

*** (3) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

** (2) Else:

*** (3) a UE does not monitor PEI;

* (1) Else (i.e., If SIB1 does not include initialDownlinkBWP-RedCap-r17 IE OR SIM include initialDownlinkBWP-RedCap-r17 IE but pagingSearchSpace is not configured in this DL BWP):

** (2) If a UE supports PEI and pei-Config-r17 IE (second PEI configuration) is included in SIB1:

*** (3) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

** (2) Else:

*** (3) a UE does not monitor PEI.

If a UE is not a RedCap UE:

* (1) If a UE supports PEI and pei-Config-r17 IE (second PEI configuration) is included in SIB1:

** (2) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

* (1) Else:

** (2) a UE does not monitor PEI.

[Embodiment 3-2] (it is Same as Embodiment 1, Except that it Takes into Account Configuration of lastUsedCellOnly)

If a UE is a RedCap UE:

* (1) If a SIB1 includes initialDownhnkBWP-RedCap-r17 IE (first initial DL BWP configuration) and pagingSearchSpace is configured in this initial DL BWP:

** (2) If a UE supports PEI and pei-Config-Redcap-r17 IE (first PEI configuration) and pei-Config-r17 IE (second PEI configuration) is included in SIB1 of camped cell:

*** (3) If lastUsedCellOnly is configured in second PEI configuration:

**** (4) If a UE has last entered RRC_IDLE or RRC_INACTIVE in this cell:

***** (5) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

**** (4) If a UE has not last entered RRC_IDLE or RRC_INACTIVE in this cell:

36

***** (5) a UE does not monitor PEI in this cell;

*** (3) Else If lastUsedCellOnly is not configured in second PEI configuration:

**** (4) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

** (2) Else (i.e., a UE does not support PEI or both first and second PEI configuration is not included):

*** (3) a UE does not monitor PEI;

* (1) Else (i.e., If SIB1 does not include initialDownlinkBWP-RedCap-r17 IE OR SIM include initialDownlinkBWP-RedCap-r17 IE but pagingSearchSpace is not configured in this DL BWP):

** (2) If a UE supports PEI and pei-Config-r17 IE (second PEI configuration) is included in SIB1:

*** (3) If lastUsedCellOnly is configured in second PEI configuration:

**** (4) If a UE has last entered RRC_IDLE or RRC_INACTIVE in this cell;

**** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration); and

**** (4) If a UE has not last entered RRC_IDLE or RRC_INACTIVE in this cell:

***** (5) a UE does not monitor PEI in this cell;

*** (3) Else If lastUsedCellOnly is not configured in second PEI configuration:

**** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

** (2) Else (i.e., a UE does not support PEI or second PEI configuration is not included):

*** (3) a UE does not monitor PEI.

If a UE is not a RedCap UE:

* (1) If a UE supports PEI and pei-Config-r17 IE (second PEI configuration) is included in SIB1:

** (2) If lastUsedCellOnly is configured in second PEI configuration:

*** (3) If a UE has last entered RRC_IDLE or RRC_INACTIVE in this cell:

**** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

*** (3) If a UE has not last entered RRC_IDLE or RRC_INACTIVE in this cell:

**** (4) a UE does not monitor PEI in this cell;

** (2) Else If lastUsedCellOnly is not configured in second PEI configuration:

*** (3) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

* (1) Else (i.e., a UE does not support PEI or second PEI configuration is not included):

** (2) a UE does not monitor PEI.

Embodiment 3-3

If a UE is a RedCap UE:

* (1) If SIB1 includes initialDownlinkBWP-RedCap-r17 IE (first initial DL BWP configuration) and paging-SearchSpace is configured in this initial DL BWP:

** (2) If a UE supports PEI and pei-Config-Redcap-r17 IE (first PEI configuration) and pei-Config-r17 IE (second PEI configuration) is included in SIB1:

*** (3) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

** (2) Else If a UE supports PEI and pei-Config-Redcap-r17 IE (first PEI configuration) is not included in SIB1 and pei-Config-r17 IE (second PEI configuration) is included in SIB1:

*** (3) a UE monitors PEI on the DL BWP indicated by initialDownlinkBWP-RedCap (first initial DL BWP configuration) using the parameters in pei-Config-r17 IE (second PEI configuration);

** (2) Else:

*** (3) a UE does not monitor PEI;

* (1) Else (i.e., If SIB1 does not include initialDownlinkBWP-RedCap-r17 IE OR SIB1 include initialDownlinkBWP-RedCap-r17 IE but paging-SearchSpace is not configured in this DL BWP):

** (2) If a UE supports PEI and pei-Config-r17 IE (second PEI configuration) is included in SIB1:

*** (3) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

** (2) Else:

*** (3) a UE does not monitor PEI.

If a UE is not a RedCap UE:

* (1) If a UE supports PEI and pei-Config-r17 IE (second PEI configuration) is included in SIB1:

** (2) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);

* (1) Else

** (2) a UE does not monitor PEI.

[Embodiment 3-4] (it is Same as Embodiment 3, Except that it Takes into Account Configuration of lastUsedCellOnly)

Figure 9:
FIG. 9 illustrates a terminal according to an embodiment of the present disclosure.

If a UE is a RedCap UE:

* (1) If a SIB1 includes initialDownlinkBWP RedCap-r17 IE (first initial DL BWP configuration) and paging-SearchSpace is configured in this initial DL BWP:

** (2) If a UE supports PEI and pei-Config-Redcap-r17 IE (first PEI configuration) is included in SIB1 of camped cell:

*** (3) If lastUsedCellOnly is configured in second PEI configuration:

**** (4) If a UE has last entered RRC_IDLE or RRC_INACTIVE in this cell:

***** (5) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

**** (4) If a UE has not last entered RRC_IDLE or RRC_INACTIVE in this cell:

***** (5) a UE does not monitor PEI in this cell;

*** (3) Else If lastUsedCellOnly is not configured in second PEI configuration:

**** (4) a UE monitors PEI on the DL BWP indicated by initialDownlinkBWP-RedCap (first initial DL BWP configuration) using the parameters pei-SearchSpace-r17 and firstPDCCH-MonitoringOccasionOfPEI-O-r17 in pei-Config-Redcap-r17 IE (first PEI configuration) and other parameters from pei-Config-r17 IE (second PEI configuration);

** (2) Else If a UE supports PEI and pei-Config-Redcap-r17 IE (first PEI configuration) is not included in SIB1 and pei-Config-r17 IE (second PEI configuration) is included in SIB1:

*** (3) If lastUsedCellOnly is configured in second PEI configuration:

**** (4) If a UE has last entered RRC_IDLE or RRC_INACTIVE in this cell:

***** (5) a UE monitors PEI on the DL BWP indicated by initialDownlinkBWP-RedCap (first initial DL BWP configuration) using the parameters in pei-Config-r17 IE (second PEI configuration);

**** (4) If a UE has not last entered RRC_IDLE or RRC_INACTIVE in this cell:

***** (5) a UE does not monitor PEI in this cell;

*** (3) Else If lastUsedCellOnly is not configured in second PEI configuration:

**** (4) a UE monitors PEI on the DL BWP indicated by initialDownlinkBWP-RedCap (first initial DL BWP configuration) using the parameters in pei-Config-r17 IE (second PEI configuration);

** (2) Else (i.e., a UE does not support PEI or both first and second PEI configuration is not included):

*** (3) a UE does not monitor PEI;

* (1) Else (i.e., If SIB1 does not include initialDown-linkBWP-RedCap-r17 IE OR SIB1 include initial-DownlinkBWP-RedCap-r17 IE but paging-SearchSpace is not configured in this DL BWP):
  ** (2) If a UE supports PEI and pei-Config-r17 IE (second PEI configuration) is included in SIB1:
    *** (3) If lastUsedCellOnly is configured in second PEI configuration:
      **** (4) If a UE has last entered RRC_IDLE or RRC_INACTIVE in this cell;
      **** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration); and
      **** (4) If a UE has not last entered RRC_IDLE or RRC_INACTIVE in this cell:
        ***** (5) a UE does not monitor PEI in this cell;
    *** (3) Else If lastUsedCellOnly is not configured in second PEI configuration:
      **** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);
  ** (2) Else (i.e., a UE does not support PEI or second PEI configuration is not included):
    *** (3) a UE does not monitor PEI.
If a UE is not a RedCap UE:
  * (1) If a UE supports PEI and pei-Config-r17 IE (second PEI configuration) is included in SIB1:
    ** (2) If lastUsedCellOnly is configured in second PEI configuration:
      *** (3) If a UE has last entered RRC_IDLE or RRC_INACTIVE in this cell:
        **** (4) a UE monitors PEI on the DL BWP indicated by initialDownlinkBWP (second initial DL BWP configuration) using the parameters pei-SearchSpace-r17 and firstPDCCH-MonitoringOccasionOfPEI-O-r17 in pei-Config-r17 IE (second PEI configuration) and other parameters from pei-Config-r17 IE (second PEI configuration);
      *** (3) If a UE has not last entered RRC_IDLE or RRC_INACTIVE in this cell:
        **** (4) a UE does not monitor PEI in this cell;
    ** (2) Else If lastUsedCellOnly is not configured in second PEI configuration:
      *** (3) a UE monitors PEI on the DL BWP indicated by initialDownlinkBWP (second initial DL BWP configuration) using the parameters pei-SearchSpace-r17 and firstPDCCH-MonitoringOc-casionOfPEI-O-r17 in pei-Config-r17 IE (second PEI configuration) and other parameters from pei-Config-r17 IE (second PEI configuration);
  * (1) Else (i.e., a UE does not support PEI or second PEI configuration is not included):
    ** (2) a UE does not monitor PEI.
FIG. 9 illustrates a terminal according to an embodiment of the present disclosure.

Referring to FIG. 9, a terminal includes a transceiver 910, a controller 920 and a memory 930. The controller 920 may refer to a circuitry, an application-specific integrated circuit (ASIC), or at least one processor. The transceiver 910, the controller 920 and the memory 930 are configured to perform the operations of the UE illustrated in the figures, e.g., FIGS. 1 to 8, or described above. Although the transceiver 910, the controller 920 and the memory 930 are shown as separate entities, they may be realized as a single entity like a single chip. Or the transceiver 910, the controller 920 and the memory 930 may be electrically connected to or coupled with each other.

The transceiver 910 may transmit and receive signals to and from other network entities, e.g., a base station.

The controller 920 may control the UE to perform functions and/or operations according to one of the embodiments described above. In an embodiment, the operations of the terminal may be implemented using the memory 930 storing corresponding program codes. Specifically, the terminal may be equipped with the memory 930 to store program codes implementing desired operations. To perform the desired operations, the controller 920 may read and execute the program codes stored in the memory 930 by using a processor or a central processing unit (CPU).

Figure 10:
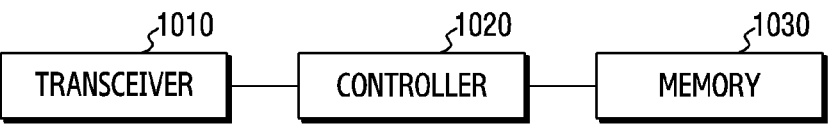
FIG. 10 illustrates a base station according to an embodiment of the present disclosure.

FIG. 10 illustrates a base station according to an embodiment of the present disclosure.

Referring to FIG. 10, a base station includes a transceiver 1010, a controller 1020 and a memory 1030. The controller 1020 may refer to a circuitry, an ASIC, or at least one processor. The transceiver 1010, the controller 1020 and the memory 1030 are configured to perform the operations of the network (e.g., gNB) illustrated in the figures, e.g., FIGS. 1 to 8, or described above. Although the transceiver 1010, the controller 1020 and the memory 1030 are shown as separate entities, they may be realized as a single entity like a single chip. The transceiver 1010, the controller 1020 and the memory 1030 may be electrically connected to or coupled with each other.

The transceiver 1010 may transmit and receive signals to and from other network entities, e.g., a terminal.

The controller 1020 may control the base station to perform functions and/or operations according to one of the embodiments described above. In an embodiment, the operations of the base station may be implemented using the memory 1030 storing corresponding program codes. Specifically, the base station may be equipped with the memory 1030 to store program codes implementing desired operations. To perform the desired operations, the controller 1020 may read and execute the program codes stored in the memory 1030 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:

receiving, from a base station, a system information block 1 (SIB1) including first configuration information on a first initial downlink bandwidth part (BWP) and second configuration information on a paging early indication (PEI), wherein the second configuration information includes a number of paging occasions per PEI and a PEI frame offset; and if the SIB1 includes third configuration information on a second initial downlink BWP for a reduced capability UE, monitoring a PEI on the second initial downlink BWP for the reduced capability UE based on the second configuration information on the PEI and the third configuration information on the second initial downlink BWP for the reduced capability UE, wherein the third configuration information includes information on a PEI search space of the second initial downlink BWP for the reduced capability UE and information on a first physical downlink control channel (PDCCH) monitoring occasion of PEI of the second initial downlink BWP for the reduced capability UE.

2. The method of claim 1, wherein the first configuration information includes information on a PEI search space of the first initial downlink BWP and information on a first PDCCH monitoring occasion of PEI of the first initial downlink BWP.

3. The method of claim 1, wherein, if the SIB1 does not include the PEI third configuration information, the PEI is not monitored in the second initial downlink BWP for the reduced capability UE.

4. The method of claim 3, wherein, if the SIB1 does not include the third configuration information, the PEI is monitored on the first initial downlink BWP based on the first configuration information and the second configuration information.

5. A method performed by a base station in a wireless communication system, the method comprising:

transmitting, to a user equipment (UE), a system information block 1 (SIB1) including first configuration information on a first initial downlink bandwidth part (BWP) and second configuration information on a paging early indication (PEI), wherein the second configuration information includes a number of paging occasions per PEI and a PEI frame offset; and if the SIB1 includes third configuration associated with information on a second initial downlink BWP for a reduced capability UE, transmitting a PEI on the second initial downlink BWP for the reduced capability UE based on the second configuration information on the PEI and the third configuration information on the second initial downlink BWP for the reduced capability UE, wherein the third configuration information includes information on a PEI search space of the second initial downlink BWP for the reduced capability UE and information on a first physical downlink control channel (PDCCH) monitoring occasion of PEI of the second initial downlink BWP for the reduced capability UE.

6. The method of claim 5, wherein the first configuration information includes information on a PEI search space of the first initial downlink BWP and information on a first PDCCH monitoring occasion of PEI of the first initial downlink BWP.

7. The method of claim 5, wherein, if the SIB1 does not include the third configuration information, the PEI is not transmitted in the second initial downlink BWP for the reduced capability UE.

8. The method of claim 7, wherein, if the SIB1 does not include the third configuration information, the PEI is transmitted on the first initial downlink BWP based on the first configuration information and the second configuration information.

9. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the reduced capability UE to:

receive, from a base station, a system information block 1 (SIB1) including first configuration information on a first initial downlink bandwidth part (BWP) and second configuration information on a paging early indication (PEI), wherein the second configuration information includes a number of paging occasions per PEI and a PEI frame offset, and if the SIB1 includes third configuration information on a second initial downlink BWP for a reduced capability UE, monitor a PEI on the second initial downlink BWP for the reduced capability UE based on the second configuration information on the PEI and the third configuration information on the second initial downlink BWP for the reduced capability UE, wherein the third configuration information includes information on a PEI search space of the second initial downlink BWP for the reduced capability UE and information on a first physical downlink control channel (PDCCH) monitoring occasion of PEI of the second initial downlink BWP for the reduced capability UE.

10. The UE of claim 9, wherein the first configuration information includes information on a PEI search space of the first initial downlink BWP and information on a first PDCCH monitoring occasion of PEI of the first initial downlink BWP.

11. The UE of claim 9, wherein, if the SIB1 does not include the third configuration information, the PEI is not monitored in the second initial downlink BWP for the reduced capability UE.

12. The UE of claim 11, wherein, if the SIB1 does not include the third configuration information, the PEI is monitored on the first initial downlink BWP based on the first configuration information and the second configuration information.

13. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), a system information block 1 (SIB1) including first configuration information on a first initial downlink bandwidth part (BWP) and second configuration information on a paging early indication (PEI), wherein the second configuration information includes a number of paging occasions per PEI and a PEI frame offset, and if the SIB1 includes third configuration information on a second initial downlink BWP for a reduced capability UE, transmit a PEI on the second initial downlink BWP, and a third PEI for the reduced capability UE based on the second configuration information on the PEI and the third configuration information on the second initial downlink BWP for the reduced capability UE, wherein the third configuration information includes information on a PEI search space of the second initial downlink BWP for the reduced capability UE and information on a first physical downlink control channel (PDCCH) monitoring occasion of PEI of the second initial downlink BWP for the reduced capability UE.

14. The base station of claim 13, wherein the first configuration information includes information on a PEI search space of the first initial downlink BWP and information on a first PDCCH monitoring occasion of PEI of the first initial downlink BWP.

15. The base station of claim 13, wherein, if the SIB1 does not include the third configuration information, the PEI is not transmitted in the second initial downlink BWP for the reduced capability UE.

16. The base station of claim 15, wherein, if the SIB1 does not include the third configuration information, the PEI is transmitted on the first initial downlink BWP based on the first configuration information and the second configuration information.

* * * * *